(12) United States Patent
Eryurek et al.

(10) Patent No.: US 7,254,518 B2
(45) Date of Patent: *Aug. 7, 2007

(54) PRESSURE TRANSMITTER WITH DIAGNOSTICS

(75) Inventors: Evren Eryurek, Edina, MN (US); Kadir Kavaklioglu, Edina, MN (US)

(73) Assignee: Rosemount Inc., Eden Prairie, MN (US)

( * ) Notice: Subject to any disclaimer, the term of this patent is extended or adjusted under 35 U.S.C. 154(b) by 196 days.

This patent is subject to a terminal disclaimer.

(21) Appl. No.: 10/801,073

(22) Filed: Mar. 15, 2004

(65) Prior Publication Data

US 2004/0249583 A1    Dec. 9, 2004

Related U.S. Application Data

(63) Continuation-in-part of application No. 09/852,102, filed on May 9, 2001, now Pat. No. 6,907,383, which is a continuation-in-part of application No. 09/257,896, filed on Feb. 25, 1999, now abandoned, which is a continuation-in-part of application No. 08/623,569, filed on Mar. 28, 1996, now Pat. No. 6,017,143, said application No. 09/852,102 is a continuation-in-part of application No. 09/383,828, filed on Aug. 27, 1999, now Pat. No. 6,654,697, which is a continuation-in-part of application No. 09/257,896, filed on Feb. 25, 1999, now abandoned, which is a continuation-in-part of application No. 08/623,569, filed on Mar. 28, 1996, now Pat. No. 6,017,143.

(51) Int. Cl.
    *G06F 11/30* (2006.01)

(52) U.S. Cl. ............... 702/183; 702/33; 702/45; 702/46; 702/47; 702/48; 702/49; 702/104; 702/113; 702/114; 702/116; 702/138; 702/140; 702/181; 702/182; 73/1.57

(58) Field of Classification Search ............... 702/183, 702/181, 182, 33, 45–49, 104, 113, 114, 116, 702/138, 140; 706/52, 906, 914; 73/1.57, 73/1.71

See application file for complete search history.

(56) References Cited

U.S. PATENT DOCUMENTS 3,096,434 A    7/1963    King ..................... 235/151

(Continued)

FOREIGN PATENT DOCUMENTS

CA         999950        11/1976

(Continued)

OTHER PUBLICATIONS

"Invitation to Pay Additional Fees and Annex to Form PCT/ISA/206".

(Continued)

*Primary Examiner*—Carol S. W. Tsai
*Assistant Examiner*—Phuong Huynh
(74) *Attorney, Agent, or Firm*—Westman, Champlin & Kelly, P.A.

(57) ABSTRACT

In one embodiment, a pressure transmitter is provided which diagnoses the condition of a primary element and/or an impulse line which connects to a pressure sensor. A difference circuit coupled to the pressure sensor has a difference output which represents the sensed pressure minus a moving average. A calculate circuit receives the difference output and calculates a trained output of historical data obtained during an initial training time. The calculate circuit also calculates a monitor output of current data obtained during monitoring or normal operation of the transmitter. A diagnostic circuit receives the trained output and the monitor output and generates a diagnostic output indicating a current condition.

79 Claims, 17 Drawing Sheets

U.S. PATENT DOCUMENTS

| | | | |
|---|---|---|---|
| 3,404,264 A | 10/1968 | Kugler | 235/194 |
| 3,468,164 A | 9/1969 | Sutherland | 73/343 |
| 3,590,370 A | 6/1971 | Fleischer | 324/51 |
| 3,618,592 A | 11/1971 | Stewart | 128/2.05 R |
| 3,688,190 A | 8/1972 | Blum | 324/61 R |
| 3,691,842 A | 9/1972 | Akeley | 73/398 C |
| 3,701,280 A | 10/1972 | Stroman | 73/194 |
| 3,849,637 A | 11/1974 | Caruso et al. | 235/151 |
| 3,855,858 A | 12/1974 | Cushing | 73/194 EM |
| 3,952,759 A | 4/1976 | Ottenstein | 137/12 |
| 3,973,184 A | 8/1976 | Raber | 324/51 |
| RE29,383 E | 9/1977 | Gallatin et al. | 137/14 |
| 4,058,975 A | 11/1977 | Gilbert et al. | 60/39.28 |
| 4,099,413 A | 7/1978 | Ohte et al. | 73/359 |
| 4,102,199 A | 7/1978 | Talpouras | 73/362 |
| 4,122,719 A | 10/1978 | Carlson et al. | 73/342 |
| 4,249,164 A | 2/1981 | Tivy | 340/870.3 |
| 4,250,490 A | 2/1981 | Dahlke | 340/870.37 |
| 4,279,013 A | 7/1981 | Dahlke | 340/870.37 |
| 4,337,516 A | 6/1982 | Murphy et al. | 364/551 |
| 4,399,824 A | 8/1983 | Davidson | 128/736 |
| 4,417,312 A | 11/1983 | Cronin et al. | 364/510 |
| 4,517,468 A | 5/1985 | Kemper et al. | 290/52 |
| 4,528,869 A | 7/1985 | Kubo et al. | 74/695 |
| 4,530,234 A | 7/1985 | Cullick et al. | 73/53 |
| 4,540,468 A | 9/1985 | Genco et al. | 162/49 |
| 4,571,689 A | 2/1986 | Hildebrand et al. | 364/481 |
| 4,630,265 A | 12/1986 | Sexton | 370/85 |
| 4,635,214 A | 1/1987 | Kasai et al. | 364/551 |
| 4,642,782 A | 2/1987 | Kemper et al. | 364/550 |
| 4,644,479 A | 2/1987 | Kemper et al. | 364/550 |
| 4,649,515 A | 3/1987 | Thompson et al. | 364/900 |
| 4,668,473 A | 5/1987 | Agarwal | 422/62 |
| 4,686,638 A | 8/1987 | Furuse | 364/558 |
| 4,696,191 A | 9/1987 | Claytor et al. | 73/600 |
| 4,707,796 A | 11/1987 | Calabro et al. | 364/552 |
| 4,720,806 A | 1/1988 | Schippers et al. | 364/551 |
| 4,736,367 A | 4/1988 | Wroblewski et al. | 370/85 |
| 4,736,763 A | 4/1988 | Britton et al. | 137/10 |
| 4,758,308 A | 7/1988 | Carr | 162/263 |
| 4,777,585 A | 10/1988 | Kokawa et al. | 364/164 |
| 4,807,151 A | 2/1989 | Citron | 364/510 |
| 4,818,994 A | 4/1989 | Orth et al. | 340/501 |
| 4,831,564 A | 5/1989 | Suga | 364/551.01 |
| 4,841,286 A | 6/1989 | Kummer | 340/653 |
| 4,853,693 A | 8/1989 | Eaton-Williams | 340/588 |
| 4,873,655 A | 10/1989 | Kondraske | 364/553 |
| 4,907,167 A | 3/1990 | Skeirik | 364/500 |
| 4,924,418 A | 5/1990 | Backman et al. | 364/550 |
| 4,926,364 A | 5/1990 | Brotherton | 364/581 |
| 4,934,196 A | 6/1990 | Romano | 73/861.38 |
| 4,939,753 A | 7/1990 | Olson | 375/107 |
| 4,964,125 A | 10/1990 | Kim | 371/15.1 |
| 4,988,990 A | 1/1991 | Warrior | 340/25.5 |
| 4,992,965 A | 2/1991 | Holter et al. | 364/551.01 |
| 5,005,142 A | 4/1991 | Lipchak et al. | 364/550 |
| 5,019,760 A | 5/1991 | Chu et al. | 318/490 |
| 5,043,862 A | 8/1991 | Takahashi et al. | 364/162 |
| 5,053,815 A | 10/1991 | Wendell | 355/208 |
| 5,067,099 A | 11/1991 | McCown et al. | 364/550 |
| 5,081,598 A | 1/1992 | Bellows et al. | 364/550 |
| 5,089,979 A | 2/1992 | McEachern et al. | 364/571.04 |
| 5,089,984 A | 2/1992 | Struger et al. | 395/650 |
| 5,098,197 A | 3/1992 | Shepard et al. | 374/120 |
| 5,099,436 A | 3/1992 | McCown et al. | 364/550 |
| 5,103,409 A | 4/1992 | Shimizu et al. | 364/556 |
| 5,111,531 A | 5/1992 | Grayson et al. | 395/23 |
| 5,121,467 A | 6/1992 | Skeirik | 395/11 |
| 5,122,794 A | 6/1992 | Warrior | 340/825.2 |
| 5,122,976 A | 6/1992 | Bellows et al. | 364/550 |
| 5,130,936 A | 7/1992 | Sheppard et al. | 364/551.01 |
| 5,134,574 A | 7/1992 | Beaverstock et al. | 364/551.01 |
| 5,137,370 A | 8/1992 | McCulloch et al. | 374/173 |
| 5,142,612 A | 8/1992 | Skeirik | 395/11 |
| 5,143,452 A | 9/1992 | Maxedon et al. | 374/170 |
| 5,148,378 A | 9/1992 | Shibayama et al. | 364/551.07 |
| 5,150,289 A | 9/1992 | Badavas | 364/154 |
| 5,167,009 A | 11/1992 | Skeirik | 395/27 |
| 5,175,678 A | 12/1992 | Frerichs et al. | 364/148 |
| 5,193,143 A | 3/1993 | Kaemmerer et al. | 395/51 |
| 5,197,114 A | 3/1993 | Skeirik | 395/22 |
| 5,197,328 A | 3/1993 | Fitzgerald | 73/168 |
| 5,212,765 A | 5/1993 | Skeirik | 395/11 |
| 5,214,582 A | 5/1993 | Gray | 364/424.03 |
| 5,216,226 A | 6/1993 | Miyoshi | 219/497 |
| 5,224,203 A | 6/1993 | Skeirik | 395/22 |
| 5,228,780 A | 7/1993 | Shepard et al. | 374/175 |
| 5,235,527 A | 8/1993 | Ogawa et al. | 364/571.05 |
| 5,265,031 A | 11/1993 | Malczewski | 364/497 |
| 5,265,222 A | 11/1993 | Nishiya et al. | 395/3 |
| 5,269,311 A | 12/1993 | Kirchner et al. | 128/672 |
| 5,274,572 A | 12/1993 | O'Neill et al. | 364/550 |
| 5,282,131 A | 1/1994 | Rudd et al. | 364/164 |
| 5,282,261 A | 1/1994 | Skeirik | 395/22 |
| 5,293,585 A | 3/1994 | Morita | 395/52 |
| 5,303,181 A | 4/1994 | Stockton | 365/96 |
| 5,305,230 A | 4/1994 | Matsumoto et al. | 364/495 |
| 5,311,421 A | 5/1994 | Nomura et al. | 364/157 |
| 5,317,520 A | 5/1994 | Castle | 364/482 |
| 5,327,357 A | 7/1994 | Feinstein et al. | 364/502 |
| 5,333,240 A | 7/1994 | Matsumoto et al. | 395/23 |
| 5,340,271 A | 8/1994 | Freeman et al. | 415/1 |
| 5,347,843 A | 9/1994 | Orr et al. | 73/3 |
| 5,349,541 A | 9/1994 | Alexandro, Jr. et al. | 364/578 |
| 5,357,449 A | 10/1994 | Oh | 364/551.01 |
| 5,361,628 A | 11/1994 | Marko et al. | 73/116 |
| 5,365,423 A | 11/1994 | Chand | 364/140 |
| 5,365,787 A | 11/1994 | Hernandez et al. | 73/660 |
| 5,367,612 A | 11/1994 | Bozich et al. | 395/22 |
| 5,369,674 A | 11/1994 | Yokose et al. | 376/245 |
| 5,384,699 A | 1/1995 | Levy et al. | 364/413.13 |
| 5,386,373 A | 1/1995 | Keeler et al. | 364/577 |
| 5,388,465 A | 2/1995 | Okaniwa et al. | 73/861.17 |
| 5,394,341 A | 2/1995 | Kepner | 364/551.01 |
| 5,394,543 A | 2/1995 | Hill et al. | 395/575 |
| 5,404,064 A | 4/1995 | Mermelstein et al. | 310/319 |
| 5,408,406 A | 4/1995 | Mathur et al. | 364/163 |
| 5,408,586 A | 4/1995 | Skeirik | 395/23 |
| 5,410,495 A | 4/1995 | Ramamurthi | 364/511.05 |
| 5,414,645 A | 5/1995 | Hirano | 364/551.01 |
| 5,419,197 A | 5/1995 | Ogi et al. | 73/659 |
| 5,430,642 A | 7/1995 | Nakajima et al. | 364/148 |
| 5,434,774 A | 7/1995 | Seberger | 364/172 |
| 5,436,705 A | 7/1995 | Raj | 355/246 |
| 5,440,478 A | 8/1995 | Fisher et al. | 364/188 |
| 5,442,639 A | 8/1995 | Crowder et al. | 371/20.1 |
| 5,467,355 A | 11/1995 | Umeda et al. | 364/571.04 |
| 5,469,070 A | 11/1995 | Koluvek | 324/713 |
| 5,469,156 A | 11/1995 | Kogura | 340/870.38 |
| 5,469,735 A | 11/1995 | Watanabe | 73/118.1 |
| 5,469,749 A | 11/1995 | Shimada et al. | 73/861.47 |
| 5,481,199 A | 1/1996 | Anderson et al. | 324/705 |
| 5,481,200 A | 1/1996 | Voegele et al. | 324/718 |
| 5,483,387 A | 1/1996 | Bauhahn et al. | 359/885 |
| 5,485,753 A | 1/1996 | Burns et al. | 73/720 |
| 5,486,996 A | 1/1996 | Samad et al. | 364/152 |
| 5,488,697 A | 1/1996 | Kaemmerer et al. | 395/51 |
| 5,489,831 A | 2/1996 | Harris | 318/701 |
| 5,495,769 A | 3/1996 | Broden et al. | 73/718 |
| 5,510,799 A | 4/1996 | Maltby et al. | 340/870.3 |
| 5,511,004 A | 4/1996 | Dubost et al. | 364/551.01 |
| 5,521,840 A | 5/1996 | Bednar | 364/508 |
| 5,526,293 A | 6/1996 | Mozumder et al. | 364/578 |
| 5,539,638 A | 7/1996 | Keeler et al. | 364/424.03 |

| | | | | | | |
|---|---|---|---|---|---|---|
| 5,548,528 A | 8/1996 | Keeler et al. ............... 364/497 | 6,026,352 A | 2/2000 | Burns et al. ............... 702/182 |
| 5,555,190 A | 9/1996 | Derby et al. ............... 364/510 | 6,038,579 A | 3/2000 | Sekine ............... 708/400 |
| 5,560,246 A | 10/1996 | Bottinger et al. ......... 73/861.15 | 6,045,260 A | 4/2000 | Schwartz et al. ............ 374/183 |
| 5,561,599 A | 10/1996 | Lu ............... 364/164 | 6,047,220 A | 4/2000 | Eryurek et al. ............... 700/28 |
| 5,570,300 A | 10/1996 | Henry et al. ............ 364/551.01 | 6,047,222 A | 4/2000 | Burns et al. ............... 700/79 |
| 5,572,420 A | 11/1996 | Lu ............... 364/153 | 6,052,655 A | 4/2000 | Kobayashi et al. ............ 702/184 |
| 5,573,032 A | 11/1996 | Lenz et al. ............... 137/486 | 6,061,603 A | 5/2000 | Papadopoulos et al. ......... 700/83 |
| 5,591,922 A | 1/1997 | Segeral et al. ............ 73/861.04 | 6,072,150 A | 6/2000 | Sheffer ............... 219/121.83 |
| 5,598,521 A | 1/1997 | Kilgore et al. ............... 395/326 | 6,094,600 A | 7/2000 | Sharpe, Jr. et al. ............ 700/19 |
| 5,600,148 A | 2/1997 | Cole et al. ............... 250/495.1 | 6,112,131 A | 8/2000 | Ghorashi et al. ............ 700/142 |
| 5,608,650 A | 3/1997 | McClendon et al. ......... 364/510 | 6,119,047 A | 9/2000 | Eryurek et al. ............... 700/28 |
| 5,623,605 A | 4/1997 | Keshav et al. ............ 395/200.17 | 6,119,529 A | 9/2000 | Di Marco et al. ......... 73/861.68 |
| 5,629,870 A | 5/1997 | Farag et al. ............... 364/551.01 | 6,139,180 A | 10/2000 | Usher et al. ............... 374/1 |
| 5,633,809 A | 5/1997 | Wissenbach et al. ......... 364/510 | 6,151,560 A | 11/2000 | Jones ............... 702/58 |
| 5,637,802 A | 6/1997 | Frick et al. ............... 73/724 | 6,179,964 B1 | 1/2001 | Begemann et al. ......... 162/198 |
| 5,640,491 A | 6/1997 | Bhat et al. ............... 395/22 | 6,182,501 B1 | 2/2001 | Furuse et al. ............... 73/49.2 |
| 5,654,869 A | 8/1997 | Ohi et al. ............... 361/540 | 6,192,281 B1 | 2/2001 | Brown et al. ............... 700/2 |
| 5,661,668 A | 8/1997 | Yemini et al. ............... 364/550 | 6,195,591 B1 | 2/2001 | Nixon et al. ............... 700/2 |
| 5,665,899 A | 9/1997 | Willcox ............... 73/1.63 | 6,199,018 B1 | 3/2001 | Quist et al. ............... 702/34 |
| 5,669,713 A | 9/1997 | Schwartz et al. ............... 374/1 | 6,209,048 B1 | 3/2001 | Wolff ............... 710/62 |
| 5,671,335 A | 9/1997 | Davis et al. ............... 395/23 | 6,236,948 B1 | 5/2001 | Eck et al. ............... 702/45 |
| 5,672,247 A | 9/1997 | Pangalos et al. ............... 162/65 | 6,263,487 B1 | 7/2001 | Stripf et al. ............... 717/1 |
| 5,675,504 A | 10/1997 | Serodes et al. ............ 364/496 | 6,272,438 B1 | 8/2001 | Cunningham et al. ......... 702/56 |
| 5,675,724 A | 10/1997 | Beal et al. ............... 395/182.02 | 6,289,735 B1 | 9/2001 | Dister et al. ............... 73/579 |
| 5,680,109 A * | 10/1997 | Lowe et al. ............... 340/608 | 6,298,377 B1 | 10/2001 | Hartikainen et al. ......... 709/223 |
| 5,682,317 A | 10/1997 | Keeler et al. ............ 364/431.03 | 6,307,483 B1 | 10/2001 | Westfield et al. ...... 340/870.11 |
| 5,700,090 A | 12/1997 | Eryurek ............... 374/210 | 6,311,136 B1 | 10/2001 | Henry et al. ............... 702/45 |
| 5,703,575 A | 12/1997 | Kirkpatrick ............ 340/870.17 | 6,317,701 B1 | 11/2001 | Pyostsia et al. ............ 702/188 |
| 5,704,011 A | 12/1997 | Hansen et al. ............... 395/22 | 6,327,914 B1 | 12/2001 | Dutton ............... 73/861.356 |
| 5,705,978 A | 1/1998 | Frick et al. ............... 340/511 | 6,347,252 B1 | 2/2002 | Behr et al. ............... 700/2 |
| 5,708,211 A | 1/1998 | Jepson et al. ............ 73/861.04 | 6,356,191 B1 | 3/2002 | Kirkpatrick et al. ......... 340/501 |
| 5,708,585 A | 1/1998 | Kushion ............... 364/431.061 | 6,360,277 B1 | 3/2002 | Ruckley et al. ............... 9/250 |
| 5,710,370 A | 1/1998 | Shanahan et al. ............. 73/1.35 | 6,370,448 B1 | 4/2002 | Eryurek et al. ............ 700/282 |
| 5,710,708 A | 1/1998 | Wiegand ............... 364/470.1 | 6,377,859 B1 | 4/2002 | Brown et al. ............... 700/79 |
| 5,713,668 A | 2/1998 | Lunghofer et al. ......... 374/179 | 6,396,426 B1 | 5/2002 | Balard et al. ............... 341/120 |
| 5,719,378 A | 2/1998 | Jackson, Jr. et al. ......... 219/497 | 6,397,114 B1 | 5/2002 | Eryurek et al. ............... 700/51 |
| 5,736,649 A | 4/1998 | Kawasaki et al. ......... 73/861.23 | 6,405,099 B1 | 6/2002 | Nagai et al. ............... 700/159 |
| 5,741,074 A | 4/1998 | Wang et al. ............... 374/185 | 6,425,038 B1 | 7/2002 | Sprecher ............... 710/269 |
| 5,742,845 A | 4/1998 | Wagner ............... 395/831 | 6,434,504 B1 | 8/2002 | Eryurek et al. ............... 702/130 |
| 5,746,511 A | 5/1998 | Eryurek et al. ............... 374/2 | 6,449,574 B1 | 9/2002 | Eryurek et al. ............... 702/99 |
| 5,747,701 A | 5/1998 | Marsh et al. ............ 73/861.23 | 6,473,656 B1 | 10/2002 | Langels et al. ............... 700/17 |
| 5,752,008 A | 5/1998 | Bowling ............... 395/500 | 6,473,710 B1 | 10/2002 | Eryurek ............... 702/133 |
| 5,764,539 A | 6/1998 | Rani ............... 364/557 | 6,480,793 B1 | 11/2002 | Martin ............... 702/45 |
| 5,764,891 A | 6/1998 | Warrior ............... 395/200.2 | 6,492,921 B1 | 12/2002 | Kunitani et al. ............ 341/118 |
| 5,781,024 A | 7/1998 | Blomberg et al. ......... 324/763 | 6,493,689 B2 | 12/2002 | Kotoulas et al. ............ 706/23 |
| 5,781,878 A | 7/1998 | Mizoguchi et al. ......... 701/109 | 6,505,517 B1 | 1/2003 | Eryurek et al. ............ 73/861.08 |
| 5,790,413 A | 8/1998 | Bartusiak et al. ............ 364/485 | 6,519,546 B1 | 2/2003 | Eryurek et al. ............ 702/130 |
| 5,801,689 A | 9/1998 | Huntsman ............... 345/329 | 6,532,392 B1 | 3/2003 | Eryurek et al. ............ 700/54 |
| 5,805,442 A | 9/1998 | Crater et al. ............... 364/138 | 6,539,267 B1 | 3/2003 | Eruyrek et al. ............... 700/51 |
| 5,817,950 A | 10/1998 | Wiklund et al. ......... 73/861.66 | 6,546,814 B1 | 4/2003 | Choe et al. ............... 73/862.08 |
| 5,825,664 A | 10/1998 | Warrior et al. ............... 700/7 | 6,556,145 B1 | 4/2003 | Kirkpatrick et al. ... 340/870.17 |
| 5,828,567 A | 10/1998 | Eryurek et al. ............... 700/79 | 6,594,603 B1 | 7/2003 | Eryurek et al. ............ 702/104 |
| 5,829,876 A | 11/1998 | Schwartz et al. ............ 374/1 | 6,601,005 B1 | 7/2003 | Eryurek et al. ............ 702/104 |
| 5,848,383 A | 12/1998 | Yuuns ............... 702/102 | 6,611,775 B1 | 8/2003 | Coursolle et al. ............ 702/65 |
| 5,854,993 A | 12/1998 | Crichnik ............... 702/54 | 6,615,149 B1 | 9/2003 | Wehrs ............... 702/76 |
| 5,859,964 A | 1/1999 | Wang et al. ............... 395/185.01 | 6,654,697 B1 | 11/2003 | Eryurek et al. ............... 702/47 |
| 5,876,122 A | 3/1999 | Eryurek ............... 374/183 | 6,701,274 B1 | 3/2004 | Eryurek et al. ............ 702/140 |
| 5,880,376 A | 3/1999 | Sai et al. ............... 73/861.08 | 6,907,383 B2 * | 6/2005 | Eryurek et al. ............ 702/183 |
| 5,887,978 A | 3/1999 | Lunghofer et al. ......... 374/179 | 2002/0013629 A1 | 1/2002 | Nixon et al. |
| 5,908,990 A | 6/1999 | Cummings ............... 73/861.22 | 2002/0032544 A1 | 3/2002 | Reid et al. ............... 702/183 |
| 5,923,557 A | 7/1999 | Eidson ............... 364/471.03 | 2002/0108436 A1 | 8/2002 | Albuaijan ............... 73/168 |
| 5,924,086 A | 7/1999 | Mathur et al. ............... 706/25 | 2002/0121910 A1 | 9/2002 | Rome et al. ............... 324/718 |
| 5,926,778 A | 7/1999 | Pöppel ............... 702/130 | 2002/0145515 A1 | 10/2002 | Snowbarger et al. ......... 340/514 |
| 5,936,514 A | 8/1999 | Anderson et al. ......... 340/310.01 | 2002/0145568 A1 | 10/2002 | Winter ............... 343/701 |
| 5,940,290 A | 8/1999 | Dixon ............... 364/138 | 2002/0148644 A1 | 10/2002 | Schultz et al. ............ 175/39 |
| 5,956,663 A | 9/1999 | Eryurek et al. ............ 702/183 | 2003/0033040 A1 | 2/2003 | Billings ............... 700/97 |
| 5,960,375 A * | 9/1999 | Warrior et al. ............ 702/104 | 2003/0045962 A1 | 3/2003 | Eryurek et al. |
| 5,970,430 A | 10/1999 | Burns et al. ............... 702/122 | 2004/0078167 A1 | 4/2004 | Tan et al. ............... 702/181 |
| 6,014,902 A | 1/2000 | Lewis et al. ............ 73/861.12 | 2004/0093174 A1 | 5/2004 | Lander ............... 702/56 |
| 6,016,523 A | 1/2000 | Zimmerman et al. ......... 710/63 | | | |
| 6,016,706 A | 1/2000 | Yamamoto et al. ............... 9/6 | | | |
| 6,017,143 A | 1/2000 | Eryurek et al. ............... 700/51 | | | |
| 6,023,399 A | 2/2000 | Kogure ............... 361/23 | DE | 32 13 866 A1 | 10/1983 |

FOREIGN PATENT DOCUMENTS

| | | |
|---|---|---|
| DE | 35 40 204 C1 | 9/1986 |
| DE | 40 08 560 A1 | 9/1990 |
| DE | 43 43 747 | 6/1994 |
| DE | 44 33 593 A1 | 6/1995 |
| DE | 195 02 499 A1 | 8/1996 |
| DE | 296 00 609 U1 | 3/1997 |
| DE | 197 04 694 A1 | 8/1997 |
| DE | 19930660 A1 | 7/1999 |
| DE | 199 05 071 | 8/2000 |
| DE | 19905071 A1 | 8/2000 |
| DE | 299 17 651 U1 | 12/2000 |
| DE | 100 36 971 A1 | 2/2002 |
| DE | 102 23 725 A1 | 4/2003 |
| EP | 0 122 622 A1 | 10/1984 |
| EP | 0 413 814 A1 | 2/1991 |
| EP | 0 487 419 A2 | 5/1992 |
| EP | 0 512 794 A2 | 11/1992 |
| EP | 0 594 227 A1 | 4/1994 |
| EP | 0 624 847 A1 | 11/1994 |
| EP | 0 644 470 A2 | 3/1995 |
| EP | 0 825 506 A2 | 7/1997 |
| EP | 0 827 096 A2 | 9/1997 |
| EP | 0 838 768 A2 | 9/1997 |
| EP | 0 807 804 A2 | 11/1997 |
| EP | 1 058 093 A1 | 5/1999 |
| EP | 1 022 626 A2 | 7/2000 |
| FR | 2 302 514 | 9/1976 |
| FR | 2 334 827 | 7/1977 |
| GB | 928704 | 6/1963 |
| GB | 1 534 280 | 11/1978 |
| GB | 1 534 288 | 11/1978 |
| GB | 2 310 346 A | 8/1997 |
| GB | 2 317 969 | 4/1998 |
| GB | 2 342 453 A | 4/2000 |
| GB | 2 347 232 A | 8/2000 |
| JP | 57196619 | 2/1982 |
| JP | 58-129316 | 8/1983 |
| JP | 59-116811 | 7/1984 |
| JP | 59-163520 | 9/1984 |
| JP | 59-211196 | 11/1984 |
| JP | 59-211896 | 11/1984 |
| JP | 60-000507 | 1/1985 |
| JP | 60-76619 | 5/1985 |
| JP | 60-131495 | 7/1985 |
| JP | 60-174915 | 9/1985 |
| JP | 62-30915 | 2/1987 |
| JP | 62-50901 | 9/1987 |
| JP | 64-01914 | 1/1989 |
| JP | 64-72699 | 3/1989 |
| JP | 2-05105 | 1/1990 |
| JP | 3-229124 | 10/1991 |
| JP | 4-70906 | 3/1992 |
| JP | 5-122768 | 5/1993 |
| JP | 6-95882 | 4/1994 |
| JP | 06242192 | 9/1994 |
| JP | 06-248224 | 10/1994 |
| JP | 7-063586 | 3/1995 |
| JP | 07234988 | 9/1995 |
| JP | 07294356 A2 | 11/1995 |
| JP | 8-054923 | 2/1996 |
| JP | 8-102241 | 4/1996 |
| JP | 08-114638 | 5/1996 |
| JP | 8-136386 | 5/1996 |
| JP | HEI8/1996-136386 | 5/1996 |
| JP | 8-166309 | 6/1996 |
| JP | HEI8/1996-166309 | 6/1996 |
| JP | 8-247076 | 9/1996 |
| JP | 8-313466 | 11/1996 |
| JP | 2712625 | 10/1997 |
| JP | 2712701 | 10/1997 |
| JP | 2753592 | 3/1998 |
| JP | 07225530 | 5/1998 |
| JP | 10-232170 | 9/1998 |
| JP | 11-083575 | 3/1999 |
| JP | 3129121 | 11/2000 |
| JP | 3139597 | 12/2000 |
| JP | 3147275 | 12/2000 |
| WO | WO 94/25933 | 11/1994 |
| WO | WO 95/23361 | 8/1995 |
| WO | WO 96/11389 | 4/1996 |
| WO | WO 96/12993 | 5/1996 |
| WO | WO 96/39617 | 12/1996 |
| WO | WO 97/21157 | 6/1997 |
| WO | WO 97/25603 | 7/1997 |
| WO | WO 98/06024 | 2/1998 |
| WO | WO 98/13677 | 4/1998 |
| WO | WO 98/14855 | 4/1998 |
| WO | WO 98/20469 | 5/1998 |
| WO | WO 98/39718 | 9/1998 |
| WO | WO 99/19782 | 4/1999 |
| WO | WO 00/41050 | 7/2000 |
| WO | WO 00/55700 | 9/2000 |
| WO | WO 00/70531 | 11/2000 |
| WO | WO 01/01213 A1 | 1/2001 |
| WO | WO 01/59346 | 8/2001 |
| WO | WO 01/77766 | 10/2001 |
| WO | WO 02/27418 | 4/2002 |
| WO | WO 03/046713 A1 | 6/2003 |

OTHER PUBLICATIONS

"Notification of Transmittal of The International Search Report or the Declaration", PCT/US2004/025291.
U.S. Appl. No. 10/893,144, filed Jul. 2004, Brown et al.
U.S. Appl. No. 09/257,896, filed Feb. 25, 1999, Eryurek et al.
U.S. Appl. No. 09/409,098, filed Sep. 30, 1999, Eryurek et al.
U.S. Appl. No. 09/799,824, filed Mar. 5, 2001, Rome et al.
U.S. Appl. No. 09/855,179, filed May 14, 2001, Eryurek et al.
U.S. Appl. No. 09/852,102, filed May 9, 2001, Eryurek et al.
U.S. Appl. No. 09/972,078, filed Oct. 5, 2001, Eryurek et al.
U.S. Appl. No. 10/635,944, filed Aug. 7, 2003, Huisenga et al.
"A TCP\IP Tutorial" by, Socolofsky et al., Spider Systems Limited, Jan. 1991 pp. 1-23.
"Approval Standards For Explosionproof Electrical Equipment General Requirements", Factory Mutual Research, Cl. No. 3615, Mar. 1989, pp. 1-34.
"Approval Standard Intrinsically Safe Apparatus and Associated Apparatus For Use In Class I, II, and III, Division 1 Hazardous (Classified) Locations", Factory Mutual Research, Cl. No. 3610, Oct. 1988, pp. 1-70.
"Automation On-line" by, Phillips et al., Plant Services, Jul. 1997, pp. 41-45.
"Climb to New Heights by Controlling your PLCs Over the Internet" by, Phillips et al., Intech, Aug. 1998, pp. 50-51.
"CompProcessor For Piezoresistive Sensors" MCA Technologies Inc. (MCA7707), pp. 1-8.
"Ethernet emerges as viable, inexpensive fieldbus", Paul G. Schreier, Personal Engineering, Dec. 1997, p. 23-29.
"Ethernet Rules Closed-loop System" by, Eidson et al., Intech, Jun. 1998, pp. 39-42.
"Fieldbus Standard for Use in Industrial Control Systems Part 2: Physical Layer Specification and Service Definition", ISA-S50.Feb. 1992, pp. 1-93.
"Fieldbus Standard for Use in Industrial Control Systems Part 3: Data Link Service Definition", ISA-S50.Feb. 1997, Part 3, Aug. 1997, pp. 1-159.
Fieldbus Standard For Use in Industrial Control Systems Part 4: Data Link Protocol Specification, ISA-S50.Feb. 1997, Part 4, Aug. 1997, pp. 1-148.
"Fieldbus Support For Process Analysis" by, Blevins et al., Fisher-Rosemount Systems, Inc., 1995, pp. 121-128.
"Fieldbus Technical Overview Understanding FOUNDATION™ fieldbus technology", Fisher-Rosemount, 1998, pp. 1-23.
"Hypertext Transfer Protocol—HTTP/1.0" by, Berners-Lee et al., MIT/LCS, May 1996, pp. 1-54.

"Infranets, Intranets, and the Internet" by, Pradip Madan, Echelon Corp, Sensors, Mar. 1997, pp. 46-50.
"Internet Technology Adoption into Automation" by, Fondl et al., Automation Business, pp. 1-5.
"Internet Protocol Darpa Internet Program Protocol Specification" by, Information Sciences Institute, University of Southern California, RFC 791, Sep. 1981, pp. 1-43.
"Introduction to Emit", emWare, Inc., 1997, pp. 1-22.
"Introduction to the Internet Protocols" by, Charles L. Hedrick, Computer Science Facilities Group, Rutgers University, Oct. 3, 1988, pp. 1-97.
"Is There A Future Ethernet in Industrial Control?", Miclot et al., Plant Engineering, Oct. 1988, pp. 44-46, 48, 50.
LFM/SIMA Internet Remote Diagnostics Research Project Summary Report, Stanford Univeristy, Jan. 23, 1997, pp. 1-6.
"Managing Devices with the Web" by, Howard et al., Byte, Sep. 1997, pp. 45-64.
"Modular Microkernel Links GUI And Browser For Embedded Web Devices" by, Tom Williams, pp. 1-2.
"PC Software Gets Its Edge From Windows, Components, and the Internet", Wayne Labs, I&CS, Mar. 1997, pp. 23-32.
Proceedings Sensor Expo, Aneheim, California, Produced by Expocon Management Associates, Inc., Apr. 1996, pp. 9-21.
Proceedings Sensor Expo, Boston, Massachusetts, Produced by Expocon Management Associates, Inc., May 1997, pp. 1-416.
"Smart Sensor Network of the Future" by, Jay Warrior, Sensors, Mar. 1997, pp. 40-45.
"The Embedded Web Site" by, John R. Hines, IEEE Spectrum, Sep. 1996, p. 23.
"Transmission Control Protocol: Darpa Internet Program Protocol Specification" Information Sciences Institute, Sep. 1981, pp. 1-69.
"On-line Statistical Process Control for a Glass Tank Ingredient Scale," by R.A. Weisman, *IFAC real Time Programming*, 1985, pp. 29-38.
"The Performance of Control Charts for Monitoring Process Variation," by C. Lowry et al., *Commun. Statis.—Simula.*, 1995, pp. 409-437.
"A Knowledge-Based Approach for Detection and Diagnosis of Out-Of-Control Events in Manufacturing Processes," by P. Love et al., *IEEE*, 1989, pp. 736-741.
"Advanced Engine Diagnostics Using Universal Process Modeling", by P. O'Sullivan, *Presented at the 1996 SAE Conference on Future Transportation Technology*, pp. 1-9.
Parallel, Fault-Tolerant Control and Diagnostics System for Feedwater Regulation in PWRS, by E. Eryurek et al., *Processing of the American Power Conference*.
"Programmable Hardware Architecture for Sensor Validation", by M.P. Henry et al., *Control Eng. Practice*, vol. 4, No. 10., pp. 1339-1354, (1996).
"Sensor Validation for Power Plants Using Adaptive Backpropagation Neural Network," *IEEE Transactions on Nuclear Science*, vol. 37, No. 2, by E. Eryurek et al. Apr. 1990, pp. 1040-1047.
"Signal Processing, Data Handling and Communications: The Case for Measurement Validation", by M.P. Henry, *Department of Engineering Science, Oxford University*.
"Smart Temperature Measurement in the '90s", by T. Kerlin et al., *C&I*, (1990).
"Software-Based Fault-Tolerant Control Design for Improved Power Plant Operation," *IEEE/IFAC Joint Symposium on Computer-Aided Control System Design*, Mar. 7-9, 1994 pp. 585-590.
A Standard Interface for Self-Validating Sensors, by M.P. Henry et al., *Report No. QUEL 1884/91*, (1991).
"Taking Full Advantage of Smart Transmitter Technology Now," by G. Orrison, *Control Engineering*, vol. 42, No. 1, Jan. 1995.
"Using Artificial Neural Networks to Identify Nuclear Power Plant States," by Israel E. Alguindigue et al., pp. 1-4.
"Application of Neural Computing Paradigms for Signal Validation," by B.R. Upadhyaya et al., *Department of Nuclear Engineering*, pp. 1-18.
"Application of Neural Networks for Sensor Validation and Plant Monitoring," by B. Upadhyaya et al., *Nuclear Technology*, vol. 97, No. 2, Feb. 1992 pp. 170-176.

"Automated Generation of Nonlinear System Characterization for Sensor Failure Detection," by B.R. Upadhyaya et al., *ISA*, 1989 pp. 269-274.
"In Situ Calibration of Nuclear Plant Platinum Resistance Thermometers Using Johnson Noise Methods," *EPRI*, Jun. 1983.
"Johnson Noise Thermometer for High Radiation and High-Temperature Environments," by L. Oakes et al., *Fifth Symposium on Space Nuclear Power Systems*, Jan. 1988, pp. 2-23.
"Development of a Resistance Thermometer For Use Up to 1600° C.", by M.J. de Groot et al., *CAL LAB*, Jul./Aug. 1996, pp. 38-41.
"Survey, Applications, And Prospects of Johnson Noise Thermometry," by T. Blalock et al., *Electrical Engineering Department*, 1981 pp. 2-11.
"Noise Thermometry for Industrial and Metrological Applications at KFA Julich," by H. Brixy et al., *7th International Symposium on Temperature*, 1992.
"Johnson Noise Power Thermometer and its Application in Process Temperature Measurement," by T.V. Blalock et al., *American Institute of Physics* 1982, pp. 1249-1259.
"Field-based Architecture is Based on Open Systems, Improves Plant Performance", by P. Cleaveland, *I&CS*, Aug. 1996, pp. 73-74.
"Tuned-Circuit Dual-Mode Johnson Noise Thermometers," by R.L. Shepard et al., Apr. 1992.
"Tuned-Circuit Johnson Noise Thermometry," by Michael Roberts et al., *7th Symposium on Space Nuclear Power Systems*, Jan. 1990.
"Smart Field Devices Provide New Process Data, Increase System Flexibility," by Mark Boland, *I&CS*, Nov. 1994, pp. 45-51.
"Wavelet Analysis of Vibration, Part I: Theory[1]," by D.E. Newland, *Journal of Vibration and Acoustics*, vol. 116, Oct. 1994, pp. 409-416.
"Wavelet Analysis of Vibration, Part 2: Wavelet Maps," by D.E. Newland, *Journal of Vibration and Acoustics*, vol. 116, Oct. 1994, pp. 417-425.
"Development of a Long-Life, High-Reliability Remotely Operated Johnson Noise Thermometer," by R.L. Shepard et al., *ISA*, 1991, pp. 77-84.
"Application of Johnson Noise Thermometry to Space Nuclear Reactors," by M.J. Roberts et al., *Presented at the 6th Symposium on Space Nuclear Power Systems*, Jan. 9-12, 1989.
"A Decade of Progress in High Temperature Johnson Noise Thermometry," by T.V. Blalock et al., *American Institute of Physics*, 1982 pp. 1219-1223.
"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29-Aug. 1, 1996, pp. 50-1-50-6.
"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310-1314.
"Detecting Blockage in Process Connections of Differential Pressure Transmitters", by E. Taya et al., *SICE*, 1995, pp. 1605-1608.
"Development and Application of Neural Network Algorithms For Process Diagnostics," by B.R. Upadhyaya et al., *Proceedings of the 29th Conference on Decision and Control*, 1990, pp. 3277-3282.
"A Fault-Tolerant Interface for Self-Validating Sensors", by M.P. Henry, *Colloqium*, pp. 3/1-3/2 (Nov. 1990).
"Fuzzy Logic and Artificial Neural Networks for Nuclear Power Plant Applications," by R.C. Berkan et al., *Proceedings of the American Power Conference*.
"Fuzzy Logic and Neural Network Applications to Fault Diagnosis", by P. Frank et al., *International Journal of Approximate Reasoning*, (1997), pp. 68-88.
"Keynote Paper: Hardware Compilation-A New Technique for Rapid Prototyping of Digital Systems-Applied to Sensor Validation", by M.P. Henry, *Control Eng. Practice*, vol. 3, No. 7., pp. 907-924, (1995).
"The Implications of Digital Communications on Sensor Validation", by M. Henry et al., *Report No. QUEL 1912/92*, (1992).
"In-Situ Response Time Testing of Thermocouples", *ISA*, by H.M. Hashemian et al., Paper No. 89-0056, pp. 587-593, (1989).

"An Integrated Architecture For Signal Validation in Power Plants," by B.R. Upadhyaya et al., *Third IEEE International Symposium on Intelligent Control*, Aug. 24-26, 1988, pp. 1-6.

"Integration of Multiple Signal Validation Modules for Sensor Monitoring," by B. Upadhyaya et al., *Department of Nuclear Engineering*, Jul. 8, 1990, pp. 1-6.

"Intelligent Behaviour for Self-Validation Sensors", by M.P. Henry, *Advances In Measurement*, pp. 1-7, (May 1990).

"Measurement of the Temperature Fluctuation in a Resistor Generating 1/F Fluctuation," by S. Hashiguchi, *Japanese Journal of Applied Physics*, vol. 22, No. 5, Part 2, May 1983, pp. L284-L286.

"Check of Semiconductor Thermal Resistance Elements by the Method of Noise Thermometry", by A. B. Kisilevskii et al., *Measurement Techniques*, vol. 25, No. 3, Mar. 1982, New York, USA, pp. 244-246.

"Neural Networks for Sensor Validation and Plant Monitoring," by B. Upadhyaya, *International Fast Reactor Safety Meeting*, Aug. 12-16, 1990, pp. 2-10.

"Neural Networks for Sensor Validation and Plantwide Monitoring," by E. Eryurek, 1992.

"A New Method of Johnson Noise Thermometry", by C.J. Borkowski et al., *Rev. Sci. Instrum.*, vol. 45, No. 2, (Feb. 1974) pp. 151-162.

"Thermocouple Continuity Checker," IBM Technical Disclosure Bulletin, vol. 20, No. 5, pp. 1954 (Oct. 1977).

"A Self-Validating Thermocouple," Janice C-Y et al., IEEE Transactions on Control Systems Technology, vol. 5, No. 2, pp. 239-253 (Mar. 1997).

*Instrument Engineers' Handbook*, Chapter IV entitled "Temperature Measurements," by T.J. Claggett, pp. 266-333 (1982).

"emWare's Releases EMIT 3.0, Allowing Manufacturers to Internet and Network Enable Devices Royalty Free," 3 pages, PR Newswire (Nov. 4, 1998).

Warrior, J., "The IEEE P1451.1 Object Model Network Independent Interfaces for Sensors and Actuators," pp. 1-14, Rosemount Inc. (1997).

Warrior, J., "The Collision Between the Web and Plant Floor Automation," 6[Th]. WWW Conference Workshop in Embedded Web Technology, Santa Clara, CA (Apr. 7, 1997).

Microsoft Press Computer Dictionary, 3rd Edition, p. 124.

"Internal Statistical Quality Control for Quality Monitoring Instruments", by P. Girling et al., *ISA*, 15 pgs., 1999.

Web Pages from www.triant.com (3 pgs.).

"Statistical Process Control (Practice Guide Series Book)", *Instrument Society of America*, 1995, pp. 1-58 and 169-204.

"Time-Frequency Analysis of Transient Pressure Signals for a Mechanical Heart Valve Cavitation Study," *ASAIO Journal*, by Alex A. Yu et al., vol. 44, No. 5, pp. M475-M479, (Sep.-Oct. 1998).

"Transient Pressure Signals in Mechanical Heart Valve Caviation," by Z.J. Wu et al., pp. M555-M561 (undated).

"Caviation in Pumps, Pipes and Valves," *Process Engineering*, by Dr. Ronald Young, pp. 47 and 49 (Jan. 1990).

"Quantification of Heart Valve Cavitation Based on High Fidelity Pressure Measurements," *Advances in Bioengineering 1994*, by Laura A. Garrison et al., BED-vol. 28, pp. 297-298 (Nov. 6-11, 1994).

"Monitoring and Diagnosis of Cavitation in Pumps and Valves Using the Wigner Distribution," *Hydroaccoustic Facilities, Instrumentation, and Experimental Techniques*, NCA-vol. 10, pp. 31-36 (1991).

"Developing Predictive Models for Cavitation Erosion," *Codes and Standards in A Global Environment*, PVP-vol. 259, pp. 189-192 (1993).

"Self-Diagnosing Intelligent Motors: A Key Enabler for Next Generation Manufacturing System," by Fred M. Discenzo et al., pp. 3/1-3/4 (1999).

"A Microcomputer-Based Instrument for Applications in Platinum Resistance Thermomety," by H. Rosemary Taylor and Hector A. Navarro, Journal of Physics E. Scientific Instrument, vol. 16, No. 11, pp. 1100-1104 (1983).

"Experience in Using Estelle for the Specification and Verification of a Fieldbus Protocol: FIP," by Barretto et al., Computer Networking, pp. 295-304 (1990).

"Computer Simulation of H1 Field Bus Transmission," by Utsumi et al., Advances in Instrumentation and Control, vol. 46, Part 2, pp. 1815-1827 (1991).

"Progress in Fieldbus Developments for Measuring and Control Application," by A. Schwaier, Sensor and Actuators, pp. 115-119 (1991).

"Ein Emulationssystem zur Leistungsanalyse von Feldbussystemen, Teil 1," by R. Hoyer, pp. 335-336 (1991).

"Simulatore Integrato: Controllo su bus di campo," by Barabino et al., Automazione e Strumentazione, pp. 85-91 (Oct. 1993).

"Ein Modulares, verteiltes Diagnose-Expertensystem für die Fehlerdiagnose in lokalen Netzen," by Jürgen M. Schröder, pp. 557-565 (1990).

"Fault Diagnosis of Fieldbus Systems," by Jürgen Quade, pp. 577-581 (Oct. 1992).

"Ziele und Anwendungen von Feldbussystemen," by T. Pfeifer et al., pp. 549-557 (Oct. 1987).

"PROFIBUS Infrastructure Measures," by Tilo Pfeifer et al., pp. 416-419 (Aug. 1991).

"Simulation the Time Behaviour of Fieldbus Systems," by O. Schnelle, pp. 440-442 (1991).

"Modélisation et simulation d'un bus de terrain: FIP," by Song et al, pp. 5-9 (undated).

"Field Bus Networks for Automation Systems Containing Intelligent Functional Unites," by W. Kriesel et al., pp. 486-489 (1987).

"Field Buses for Process Interconnection with Digital Control Systems," Tecnología, pp. 141-147 (1990).

"Decentralised Systems with Real-Time Field Bus," Netzwerke, Jg. Nr.3 v. 14.3, 4 pages (1990).

"Process Measurement and Analysis," by Liptak et al., Instrument Engineers' Handbook, Third Edition, pp. 528-530, (1995).

"Improving Dynamic Performance of Temperature Sensors With Fuzzy Control Techniques," by Wang Lei et al., pp. 872-873 (1992).

"Microsoft Press Computer Dictionary" 2nd Edition, 1994, Microsoft Press. p. 156.

International Search Report from Application No. PCT/US01/40791 with international filing date of May 22, 2001.

International Search Report from Application No. PCT/US01/40782 with international filing date of May 22, 2001.

International Search Report from Application No. PCT/02/14560 with international filing date of May 8, 2002.

International Search Report from Application No. PCT/US02/14934 with international filing date of May 8, 2002.

"On-Line Tool Condition Monitoring System With Wavelet Fuzzy Neural Network," by Li Xiaoli et al., pp. 271-276 (1997).

"Optimal Design of the Coils of An Electromagnetic Flow Meter," by Michalski, A. et al., IEEE Transactions on Magnetics, vol. 34, Issue 5, Part 1, pp. 2563-2566 (1998).

"Magnetic Fluid Flow Meter for Gases," Popa, N.C., IEEE Transactions on Magnetics, vol. 30, Issue 2, Part 1-2, pp. 936-938 (1993).

"New Approach to A Main Error Estimation for Primary Transducer of Electromagnetic Flow Meter," by Michalski, A., IEEE Instrumentation and Measurement Technology Conference Proceedings, vol. 2, pp. 1093-1097 (1998).

"Additional Information From Flowmeters Via Signal Analysis," by Amadi-Echendu, J.E. et al., IEEE Instrumentation and Measurement Technology Conference Record, vol. 7, pp. 187-193 (1990).

International Search Report from Application No. PCT/US02/06606 with international filing date of Mar. 5, 2002.

International Search Report from Application No. PCT/US02/30465 with international filing date of Sep. 25, 2002.

"What is a weighted moving average?", *DAU STAT Refresher*, http://cne.gmu.edu/modules/dau/stat/mvavgs/wma_bdy.html. (1995).

"Statistics Glossary: Time Series Data", by Easton et al., http://www.stats.gla.ac.uk/steps/glossary/time_series.html, Sep. 1997.

"The Indicators Story", Sustainable Seattle, pp. 55-59, 1998.

"Detecting Regimes in Temperature Time Series", by Clemins et al., *Artificial Neural Networks in Engineering, Proceedings*, pp. 727-732, 2001.

"Re: Digital Filter-Moving Average", The Math Forumn, http://mathforum.org/discuss/sci.math/a/t/177212, Sep. 28, 1998.

U.S. Appl. No. 10/675,014, filed Sep. 2003, Longsdorf et al.

U.S. Appl. No. 10/744,809, filed Dec. 2003, Brown et al.

"Notification of Transmittal of The International Search Report or the Declaration", PCT/US2004/017300.

"Notification of Transmittal of The International Search Report or the Declaration", PCT/US2005/011385.

International Search Report and Written Opinion for corresponding Application No. PCT/US2005/020010, filed Jun. 7, 2005.

"Gas Pipeline Monitoring by Acoustic Method", by H. Koyama et al., *Transactions of the Society of Instruments and Control Engineers*, vol. 29, No. 3, pp. 295-301, 1993.

"Experience with the Acoustic Ranger-A sound Method for Tube Inspection", by E. S. Morgan, *Materials Evaluation, Columbus, OH*, vol. 39, pp. 926-930, Sep. 1981.

"On-Line Detection of Blockages in Pressure Sensing Systems", by D. W. Mitchell et al., *ASME/JSME, Nuclear Engineering Conference*, vol. 2, pp. 775-781, Mar. 1993.

"Detecting Blockage in Process Connections of Differential Pressure Transmitters", by E. Taya et al., *SICE 95-Proceedings of the 34th SICE Annual Conference*, pp. 1605-1608, Jul. 1995.

"Invitation to Pay Additional Fees-Annex to Form PCT/ISA/206 Communication Relating to the Results of the Partial International Search", PCT/US2004/041490.

"Notification of Transmittal of the International Search Report or the Declaration", PCT/US2005/011385.

\* cited by examiner

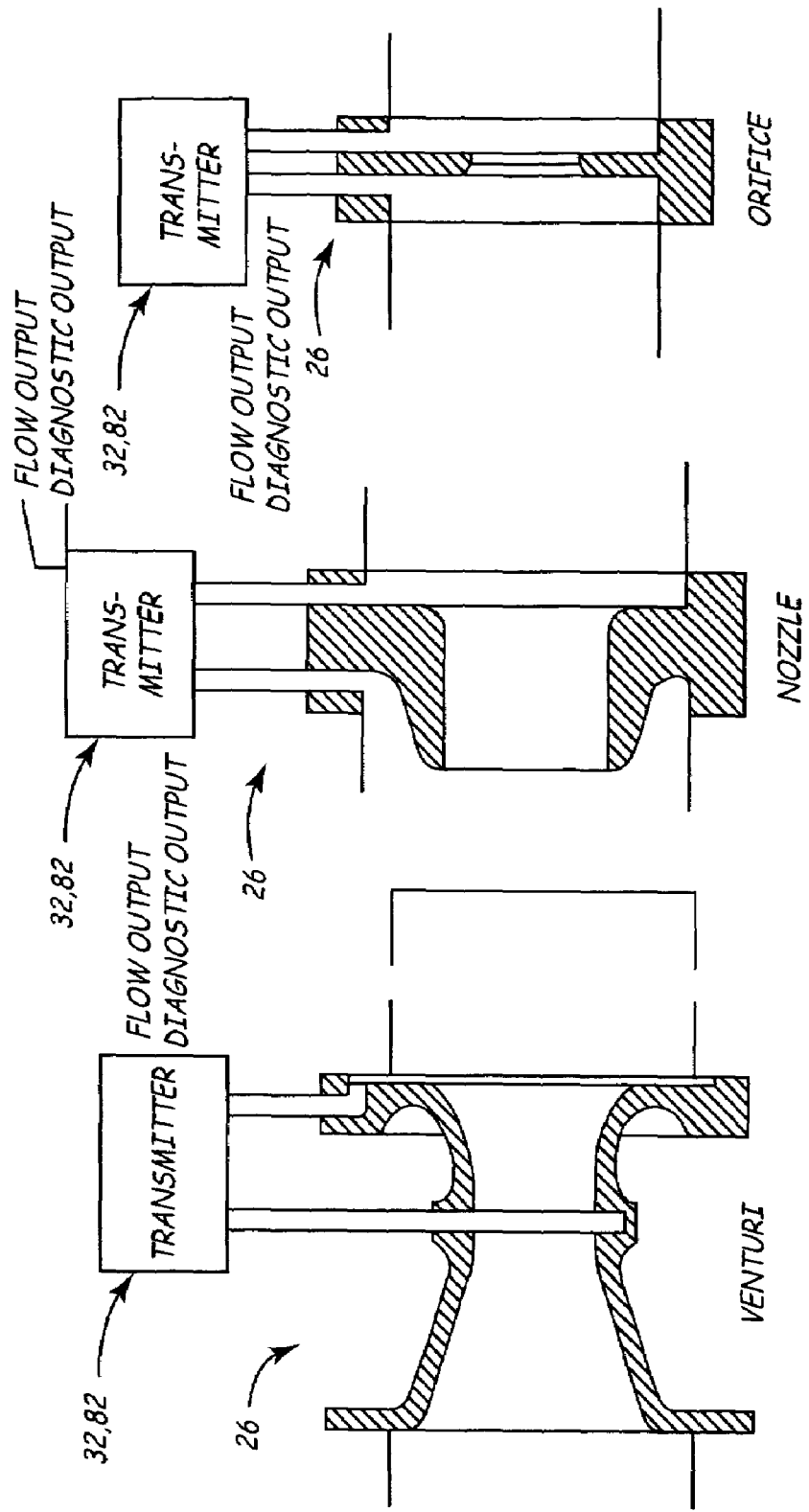

PRESSURE TRANSMITTER WITH DIAGNOSTICS

This is a Continuation-In-Part of U.S. application Ser. No. 09/852,102, filed May 9, 2001 now U.S. Pat. No. 6,907,383, which is a Continuation-In-Part of U.S. application Ser. No. 09/257,896, filed Feb. 25, 1999 now abandoned, which is a Continuation-In-Part of U.S. application Ser. No. 08/623,569 filed on Mar. 28, 1996, now U.S. Pat. No. 6,017,143, application Ser. No. 09/852,102 is also a Continuation-In-Part of U.S. application Ser. No. 09/383,828 filed on Aug. 27, 1999, now U.S. Pat. No. 6,654,697, which is a Continuation-In-Part of U.S. application Ser. No. 09/257,896, filed Feb. 25, 1999 now abandoned which is a Continuation-In-Part of U.S. application Ser. No. 08/623,569, filed Mar. 28, 1996, now U.S. Pat. No. 6,017,143.

BACKGROUND OF THE INVENTION

Pressure transmitters are used in industrial process control environments and couple to the process fluid through impulse lines. Pressure measurements can be used to measure flow, or level, for example. The impulse lines can become plugged over time, which also adversely affects calibration.

Disassembly and inspection of the impulse lines is one method used to detect and correct plugging of lines. Another known method for detecting plugging is to periodically add a "check pulse" to the measurement signal from a pressure transmitter. This check pulse causes a control system connected to the transmitter to disturb the flow. If the pressure transmitter fails to accurately sense the flow disturbance, an alarm signal is generated indicating line plugging. Another known method for detecting plugging is sensing of both static and differential pressures. If there is inadequate correlation between oscillations in the static and differential pressures, then an alarm signal is generated indicating line plugging. Still another known method for detecting line plugging is to sense static pressures and pass them through high pass and low pass filters. Noise signals obtained from the filters are compared to a threshold, and if variance in the noise is less than the threshold, then an alarm signal indicates that the line is blocked.

These known methods use techniques which can increase the complexity and reduce reliability of the devices. There is thus a need for a better diagnostic technology providing more predictive, less reactive maintenance for reducing cost or improving reliability.

SUMMARY OF THE INVENTION

A pressure transmitter diagnoses the condition of its primary element and/or its impulse lines. A difference circuit coupled to the differential pressure sensor generates a difference output representing the sensed pressure minus a moving average of the sensed differential pressure. Diagnostics are based upon this determination.

BRIEF DESCRIPTION OF THE DRAWINGS

FIG. 11 illustrates a diagnostic fluid flow meter that has a venturi for a primary element.

FIG. 12 illustrates a diagnostic fluid flow meter that has a nozzle for a primary element.

FIG. 13 illustrates a diagnostic fluid flow meter that has an orifice plate for a primary element.

DETAILED DESCRIPTION OF THE PREFERRED EMBODIMENTS

Figure 1:
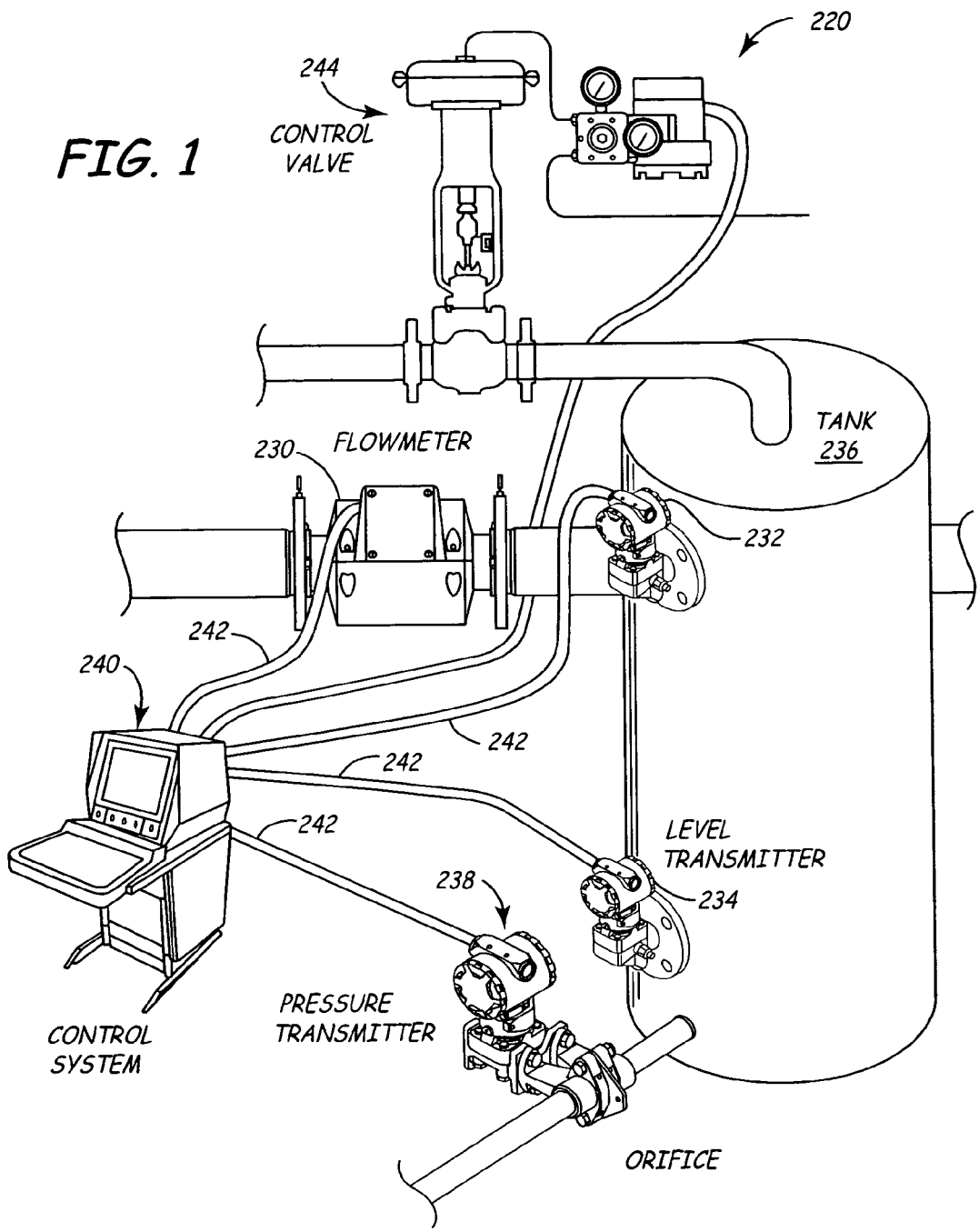
FIG. 1 is an illustration of a typical fluid processing environment for a diagnostic pressure transmitter.

In FIG. 1, a typical environment for diagnostic flow or pressure measurement is illustrated at 220. In FIG. 1, process variable transmitters such as flow meter 230, level (pressure) transmitters 232, 234 on tank 236 and integral orifice flow meter 238 are shown connected to control system 240. Process variable transmitters can be configured to monitor one or more process variables associated with fluids in a process plant such as slurries, liquids, vapors and gasses in chemical, pulp, petroleum, gas, pharmaceutical, food and other fluid processing plants. The monitored process variables can be pressure, temperature, flow, level, pH, conductivity, turbidity, density, concentration, chemical composition or other properties of fluids. Process variable transmitter includes one or more sensors that can be either internal to the transmitter or external to the transmitter, depending on the installation needs of the process plant. Process variable transmitters generate one or more transmitter outputs that represent the sensed process variable. Transmitter outputs are configured for transmission over long distances to a controller or indicator via communication busses 242. In typical fluid processing plants, a communication buss 242 can be a 4-20 mA current loop that powers the transmitter, or a fieldbus connection, a HART protocol communication or a fiber optic connection to a controller, a control system or a readout. In transmitters powered by a 2 wire loop, power must be kept low to provide intrinsic safety in explosive atmospheres.

In FIG. 1, integral orifice flow meter 238 is provided with a diagnostic output which is also coupled along the communication bus 242 connected to it. Control system 240 can be programmed to display the diagnostic output for a human operator, or can be programmed to alter its operation when there is a diagnostic warning from flow meter 238. Control system 240 controls the operation of output devices such as control valve 244, pump motors or other controlling devices.

Figure 2:
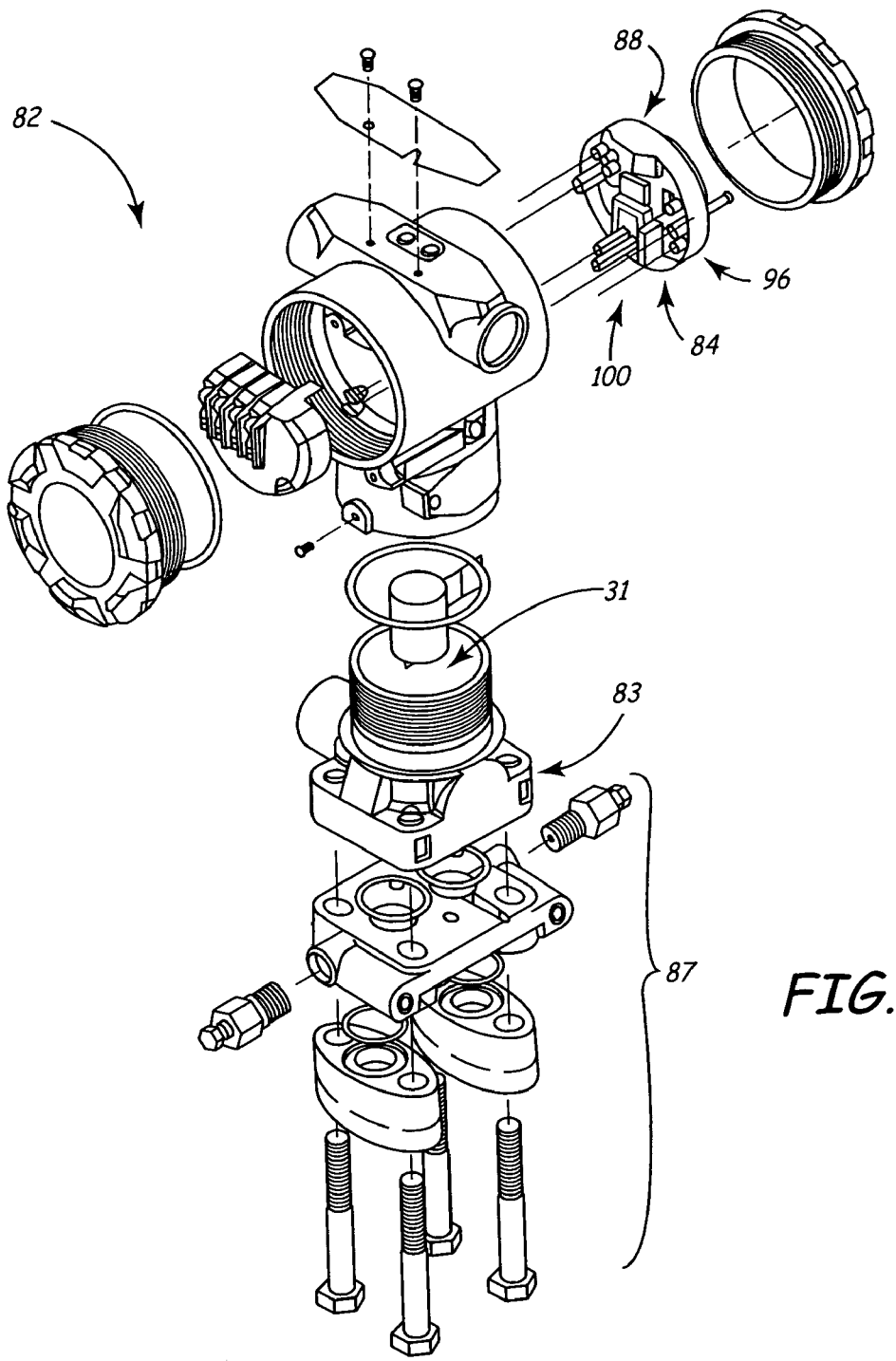
FIG. 2 is a pictorial illustration of an embodiment of a differential pressure transmitter used in a fluid flow meter that diagnoses the condition of its impulse lines and/or primary element.

In FIG. 2, an exploded view of a typical diagnostic transmitter 82 according to the present invention is shown generally. Transmitter 82 includes a flange 83 for receiving a differential pressure, a differential pressure sensor 31, electronics including an analog to digital converter 84, a microprocessor system 88, a digital to analog converter 96, and a digital communications circuit 100. Transmitter 82 is bolted to flange adapter 87. In embodiments shown herein, sensor 31 can comprise an absolute, gage, differential or other type of pressure sensor. The invention can be implemented in any type of transmitter which utilizes impulse piping to couple a pressure sensor to a process fluid. Microprocessor 88 is programmed with diagnostic algorithms as explained by examples shown in FIGS. 3, 6, 14 and 15. Flange adapter 87 connects to impulse pipes which, in turn, connect to flow around a primary flow element (not shown in FIG. 2). The arrangement of transmitter 82 of FIG. 2 is explained in more detail in FIG. 3.

Figure 3:
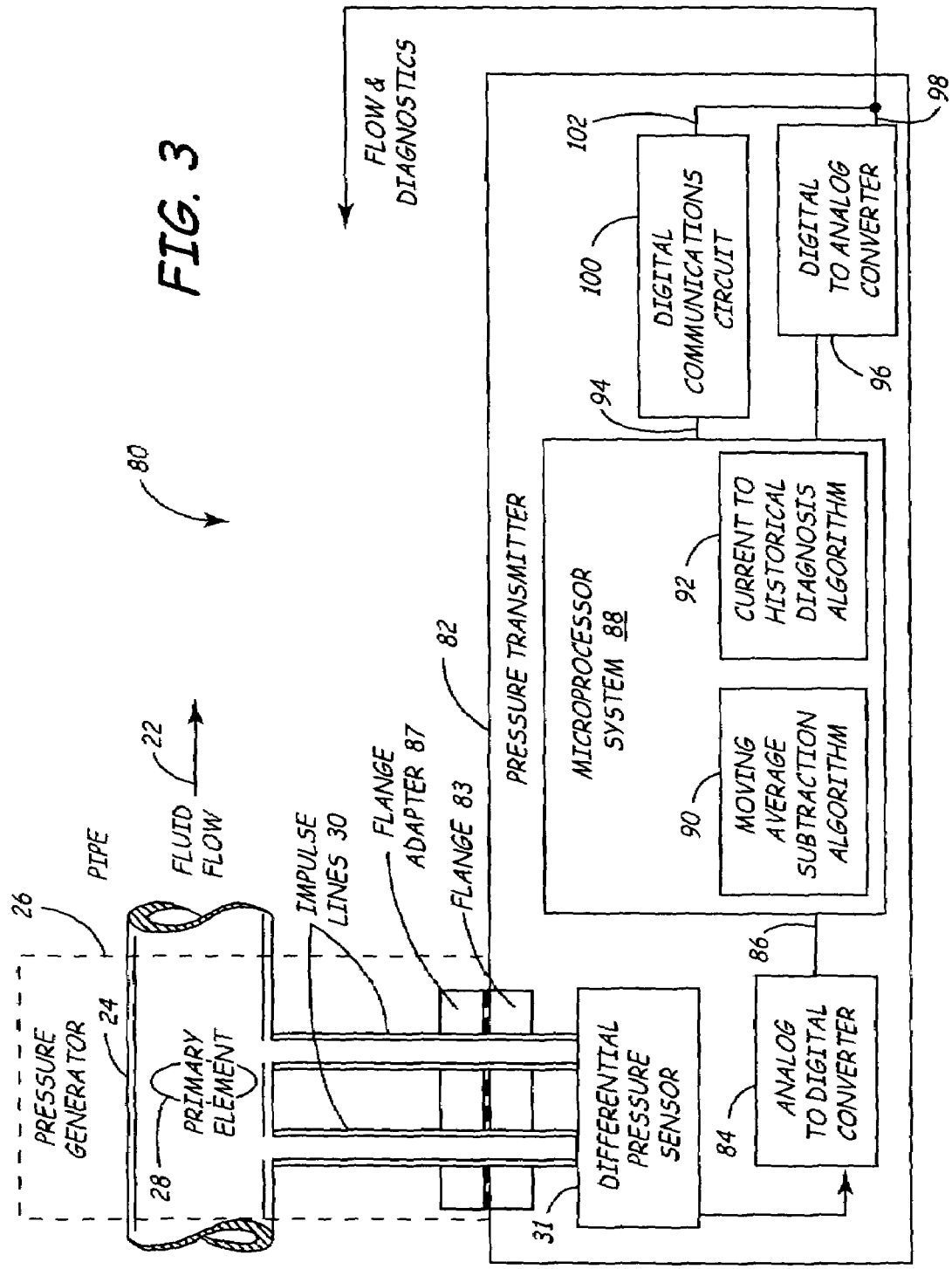
FIG. 3 is a block diagram of a fluid flow meter that diagnoses a condition of its pressure generator.

In FIG. 3, a block diagram shows a first embodiment of a fluid flow meter 80 adapted to sense fluid flow 22 in pipe 24. Fluid flow meter 80 includes a pressure generator 26 that includes a primary element 28 and impulse lines 30 that couple pressures generated in the fluid flow around the primary element 28 to a differential pressure sensor 31 in a pressure transmitter 82. The term "pressure generator" as used in this application means a primary element (e.g., an orifice plate, a pitot tube averaging pitot tubing, a nozzle, a venturi, a shedding bar, a bend in a pipe or other flow discontinuity adapted to cause a pressure drop in flow) together with impulse pipes or impulse passageways that couple the pressure drop from locations near the primary element to a location outside the flow pipe. The spectral and statistical characteristics of this pressure presented by this defined "pressure generator" at a location outside the flow pipe to a connected pressure transmitter 82 can be affected by the condition of the primary element as well as on the condition of the impulse pipes. The connected pressure transmitter 82 can be a self-contained unit, or it can be fitted with remote seals as needed to fit the application. A flange 83 on the pressure transmitter 82 (or its remote seals) couples to a flange adapter 87 on the impulse lines 30 to complete the pressure connections. Pressure transmitter 82 couples to a primary flow element 28 via impulse lines 30 to sense flow. The pressure transmitter 82 comprises a differential pressure sensor 31 adapted to couple to the impulse lines 30 via a flange arrangements. An analog to digital converter 84 couples to the pressure sensor 31 and generates a series of digital representations of the sensed pressure at 86. A microprocessor system 88 receives the series of digital representations of pressure at 86 and has a first algorithm 90 stored therein calculating a difference between the series of digital representations 86 and a moving average of the series of digital representations. A second algorithm 92 is also stored in the microprocessor system 88 that receives the difference calculated by algorithm 90 and calculates a trained data set of historical data during a training mode and calculates a current data set during a monitoring mode and generates diagnostic data 94 as a function of the current data set relative to the historical data indicating changes in the condition of pressure generator 26. A digital to analog converter 96 coupled to the microprocessor system 88 generates an analog transmitter output 98 indicative of the sensed flow rate. A digital communication circuit 100 receives the diagnostic data 94 from the microprocessor system 88 and generates a transmitter output 102 indicating the diagnostic data. The analog output 98 and the diagnostic data 102 can be coupled to indicators or controllers as desired.

Figure 4:
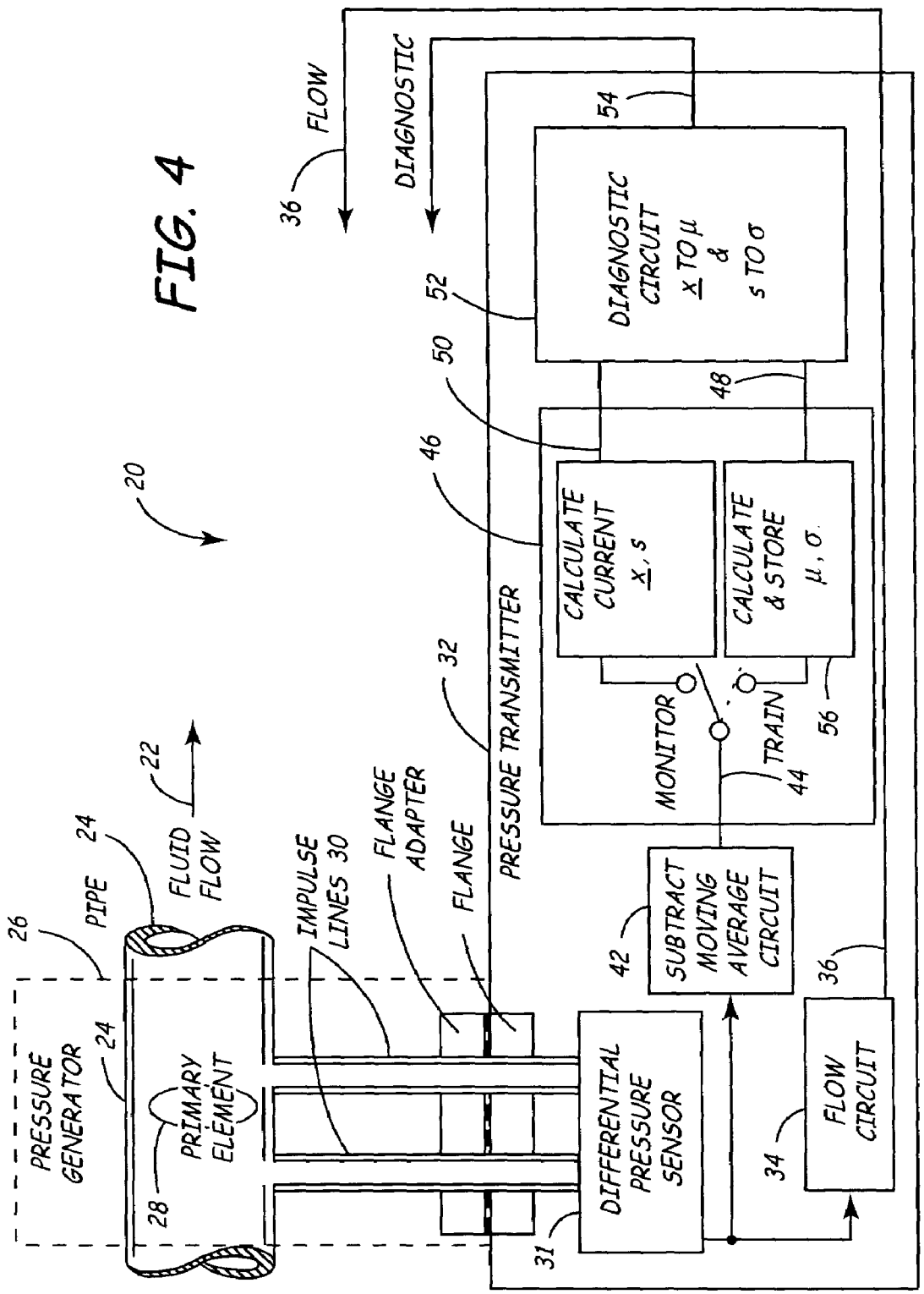
FIG. 4 is a block diagram of a fluid flow meter that diagnoses the condition of its impulse lines.

In FIG. 4, a block diagram shows a further embodiment of a fluid flow meter 20 adapted to sense fluid flow 22 in pipe 24. The fluid flow meter 20 in FIG. 4 is similar to the fluid flow meters 80 of FIG. 3 and the same reference numerals used in FIG. 3 are also used in FIG. 4 for similar elements. Fluid flow meter 20 includes a pressure generator 26 that includes a primary element 28 and impulse lines 30 that couple pressures generated in the fluid flow around the primary element 28 to a differential pressure sensor 31 in a pressure transmitter 32. The pressure transmitter 32 can be a self-contained unit, or it can be fitted with remote seals as needed to fit the application. A flange on the pressure transmitter 32 (or its remote seals) couples to a flange adapter on the impulse lines 30 to complete the pressure connections. A flow circuit 34 in the pressure transmitter 32 couples to the sensor 31 and generates a flow rate output 36 that can couple to a controller or indicator as needed.

In FIG. 4, a difference circuit 42 couples to the sensor 31 and generates data at a difference output 44 representing the sensed pressure minus a moving average. A calculate circuit 46 receives the difference output 44 and calculates a trained output 48 of historical data obtained during a training mode or time interval. After training, calculate circuit 46 calculates a monitor output 50 of current data obtained during a monitoring mode or normal operation time of the fluid flow meter 20.

In FIG. 4, a diagnostic circuit 52 receives the trained output 48 and the monitor output 50 and generating a diagnostic output 54 indicating a current condition of the pressure generator 26 relative to an historical condition. In FIG. 4, calculate circuit 46 stores the historical data in circuit 56 which includes memory.

In difference circuit 42, the moving average is calculated according to the series in Eq. 1:

$$A_j = \sum_{k=0}^{m} (P_{j+k})(W_k) \qquad \text{Eq. 1}$$

where A is the moving average, P is a series of sequentially sensed pressure values, and W is a numerical weight for a sensed pressure value, m is a number of previous sensed pressure values in the series. Provision can also be made in difference circuit 42 to filter out spikes and other anomalies present in the sensed pressure. In FIG. 4, the historical data comprises statistical data, for example, the mean ($\mu$) and standard deviation (σ) of the difference output or other statistical measurements, and the diagnostic output 54 indicates impulse line plugging. The calculate circuit 46 switches between a training mode when it is installed and a monitoring mode when it is in use measuring flow. The calculate circuit 46 stores historical data in the training mode. The diagnostic output 54 indicates a real time condition of the pressure generator 26.

In FIG. 4, statistical data, such as the mean μ and standard deviation σ, are calculated based on a relatively large number of data points or flow measurements. The corresponding sample statistical data, such as sample mean X and sample standard deviation s, are calculated from a relatively smaller number of data points. Typically, hundreds of data points are used to calculate statistical data such as μ and σ, while only about 10 data points are used to calculate sample statistical data such as X and s. The number of data points during monitoring is kept smaller in order to provide diagnostics that is real time, or completed in about 1 second. Diagnostic circuit 52 indicates line plugging if the sample standard deviation s deviates from the standard deviation σ by a preset amount, for example 10%.

Figure 5:
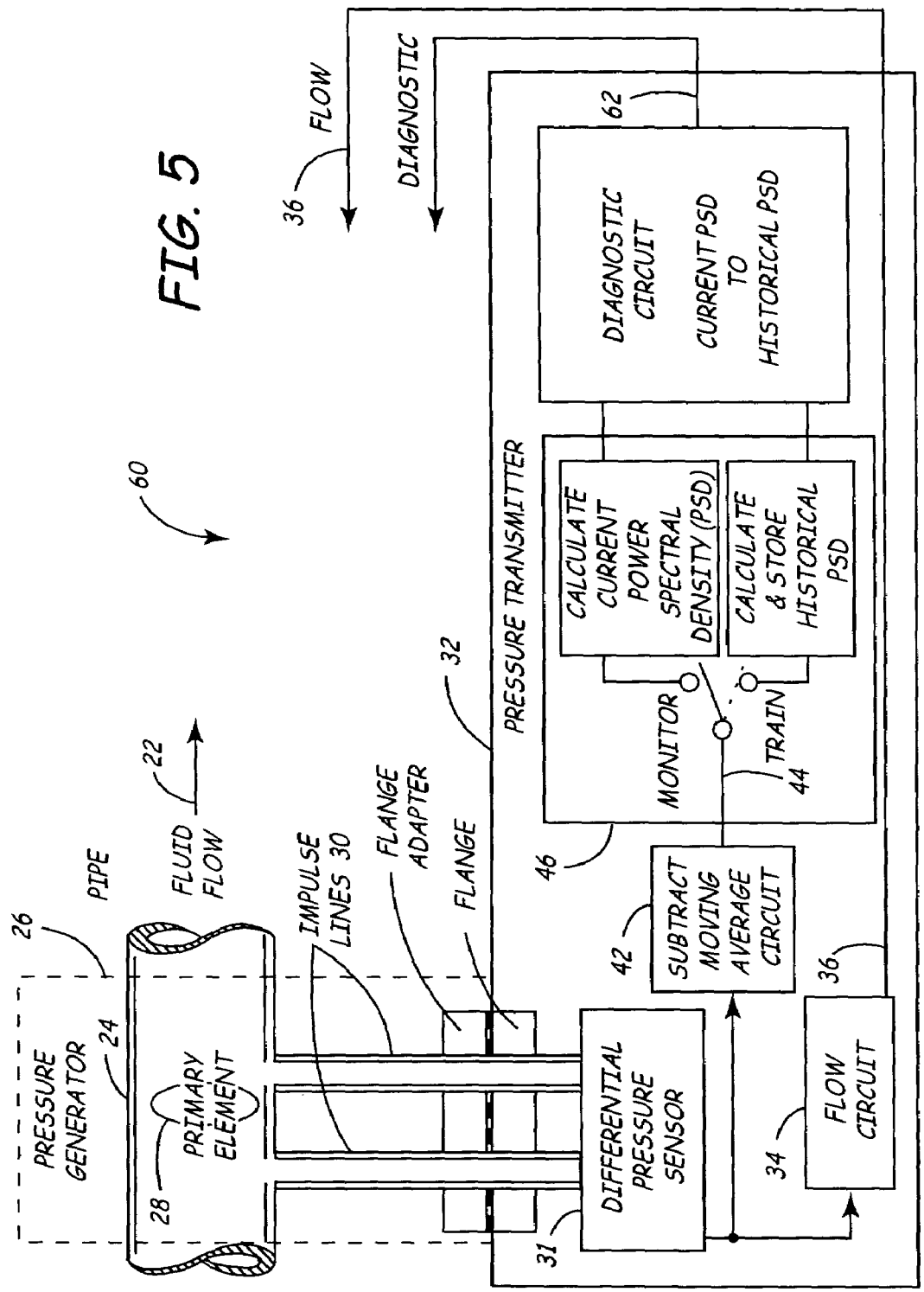
FIG. 5 is a block diagram of a fluid flow meter that diagnoses the condition of its primary element.

In FIG. 5, a fluid flow meter 60 is shown that diagnoses the condition of the primary element 28. The fluid flow meter 60 in FIG. 5 is similar to the fluid flow meter 20 of FIG. 4 and the same reference numerals used in FIG. 4 are also used in 5 for similar elements. In 5, the diagnostic output 62 indicates a condition of the primary element 28, while in FIG. 4, the diagnostic output indicates a condition of the impulse lines 30. In one embodiment, the diagnostics are based upon a power signal which is a function of the frequency distribution of power of the pressure sensor output. For example, the circuitry 46 can perform a wavelet transformation, discrete wavelet transformation, Fourier transformation, or use other techniques to determine the spectrum of the sensor signal. The power of the distributed frequencies is determined by monitoring such a converted signal over time. One example of this is the power spectral density (PSD). The power spectral density can be defined as the power (or variance) of a time series and can be described as how the power (or variance) of a time series is distributed with frequency. For example, this can be defined as the Fourier transform of an auto-correlation sequence of the time series. Another definition of power spectral density is the squared modulus of the Fourier transform of the time series, scaled by an appropriate constant term. In FIG. 5, calculate circuit 46 calculates and stores data on power spectral density (PSD) of the difference output 44 which is a type of statistical parameter. The power spectral density data is preferably in the range of 0 to 100 Hertz. The center frequency of a bandpass filter can be swept across a selected range of frequencies to generate a continuous or quasi-continuous power spectral density as a function of frequency in a manner that is well known. Various known Fourier transforms can be used.

Power spectral density, Fi, can also be calculated using Welch's method of averaged periodograms for a given data set. The method uses a measurement sequence x(n) sampled at fs samples per second, where n=1, 2, . . . N. A front end filter with a filter frequency less than fs/2 is used to reduce aliasing in the spectral calculations. The data set is divided into $F_{k,i}$ as shown in Eq. 2:

$$F_{k,i} = (1/M) \left| \sum_{n=1}^{M} x_k(n) e^{-j2\pi i \Delta f n} \right|^2 \qquad \text{Eq. 2}$$

There are $F_{k,i}$ overlapping data segments and for each segment, a periodogram is calculated where M is the number of points in the current segment. After all periodograms for all segments are evaluated, all of them are averaged to calculate the power spectrum:

$$Fi = (1/L) \sum_{k=1}^{L} F_{k,i} \qquad \text{Eq. 3}$$

Once a power spectrum is obtained for a training mode, this sequence is stored in memory, preferably EEPROM, as the baseline power spectrum for comparison to real time power spectrums. Fi is thus the power spectrum sequence and i goes from 1 to N which is the total number of points in the original data sequence. N, usually a power of 2, also sets the frequency resolution of the spectrum estimation. Therefore, Fi is also known as the signal strength at the $i^{th}$ frequency. The power spectrum typically includes a large number points at predefined frequency intervals, defining a shape of the spectral power distribution as a function of frequency.

In the detection of the primary element degradation, a relatively larger sample of the spectral density at baseline historical conditions and a relatively smaller sample of the spectral density at monitoring conditions are compared. The relatively smaller sample allows for a real time indication of problems in about 1 second. An increase in the related frequency components of the power spectrum can indicate the degradation of the primary element. Using orifice plates as primary elements, for example, changes as high as 10% are observed in spectral components when the orifice plate is degraded to a predetermined level. The amount of change can be adjusted as needed, depending on the tolerable amount of degradation and the type of primary element in use. The amount of change needed to indicate a problem is arrived at experimentally for each type of primary element arrangement. Fuzzy logic can also be used to compare the many points of the power spectrums.

Figure 6:
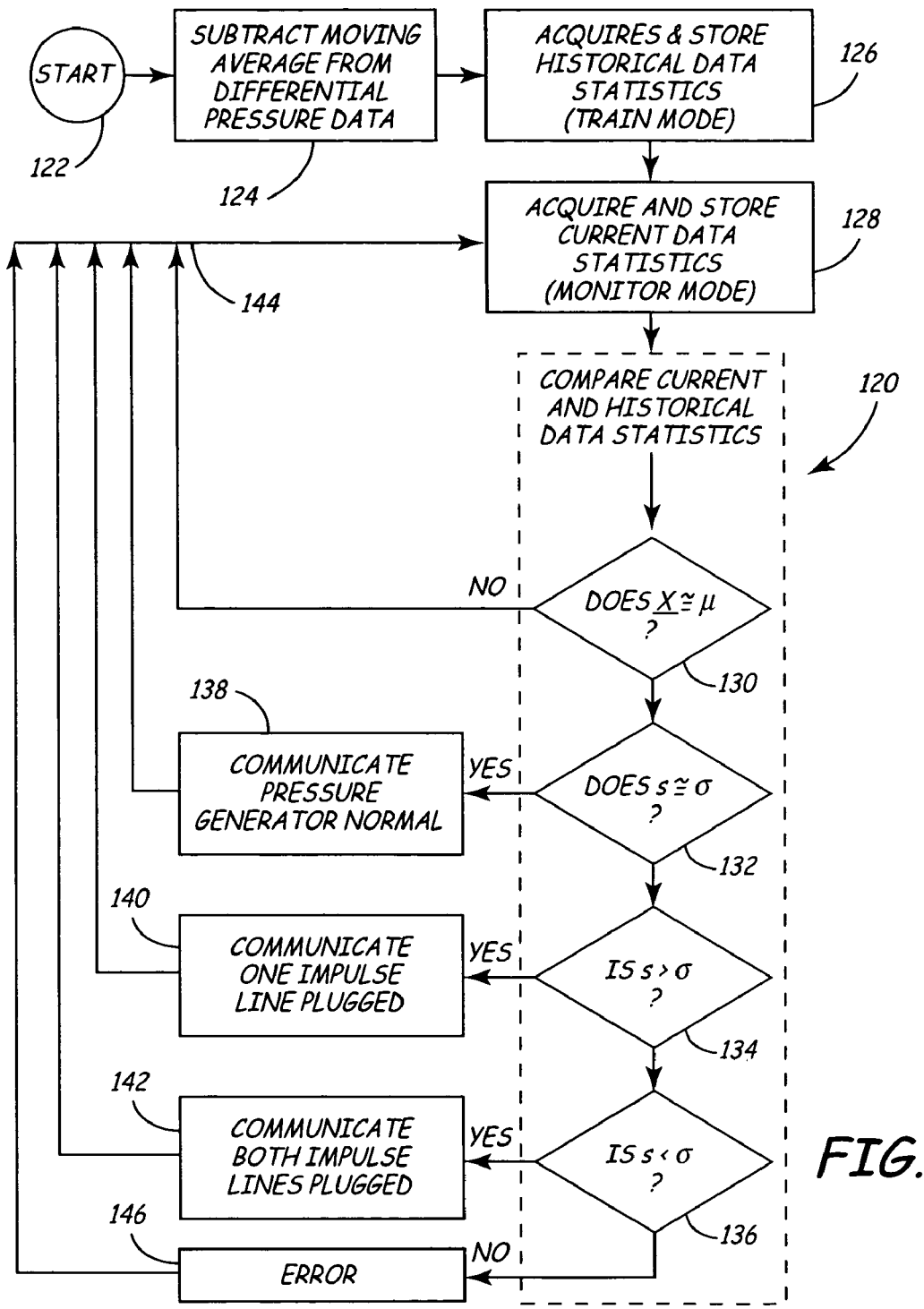
FIG. 6 is a flow chart of a process diagnosing the condition of impulse lines.

In FIG. 6, a flow chart 120 of a method of diagnosis performed in a pressure transmitter couplable to a primary flow element via impulse lines is shown. The algorithm starts at 122. A moving average is subtracted from differential pressure data as shown at 124 to calculate a difference. During a train mode, historical data on the calculated difference is acquired and stored at 126 as statistical data μ and σ, for example. During an operational MONITOR mode, current data on the difference is acquired and stored at 128 as statistical data X and s. The smaller sample of current data is compared to the larger sample of the historical data to diagnose the condition of the impulse lines. Comparisons of historical and current statistical data are made at 132, 134, 136 and a selected diagnostic transmitter output is generated at 138, 140, 142 as a function of the comparisons made at 130, 132, 134, 136 respectively. After completion of any diagnostic output, the process loops back at 144 to repeat the monitor mode diagnostics, or the transmitter can be shut down until maintenance is performed. If the diagnostic process itself fails, an error indication is provided on the diagnostic output at 146. In the method 120 of diagnosis, the historical data set comprises statistical data such as data on the mean (μ) and standard deviation (σ) of the calculated difference; the current data set comprises current sample statistical data, such as the sample average (X) and sample deviation (s) of the calculated difference. The sample deviation (s) is compared to the standard deviation (σ) to diagnose impulse line plugging, for example. Other known statistical measures of uncertainty, or statistical measures developed experimentally to fit this application can also be used besides mean and standard deviation. When there is an unusual flow condition where X is much different than μ, the diagnostics can be temporarily suspended as shown at 130 until usual flow conditions are reestablished. This helps to prevent false alarm indications.

Figures 7, 8:
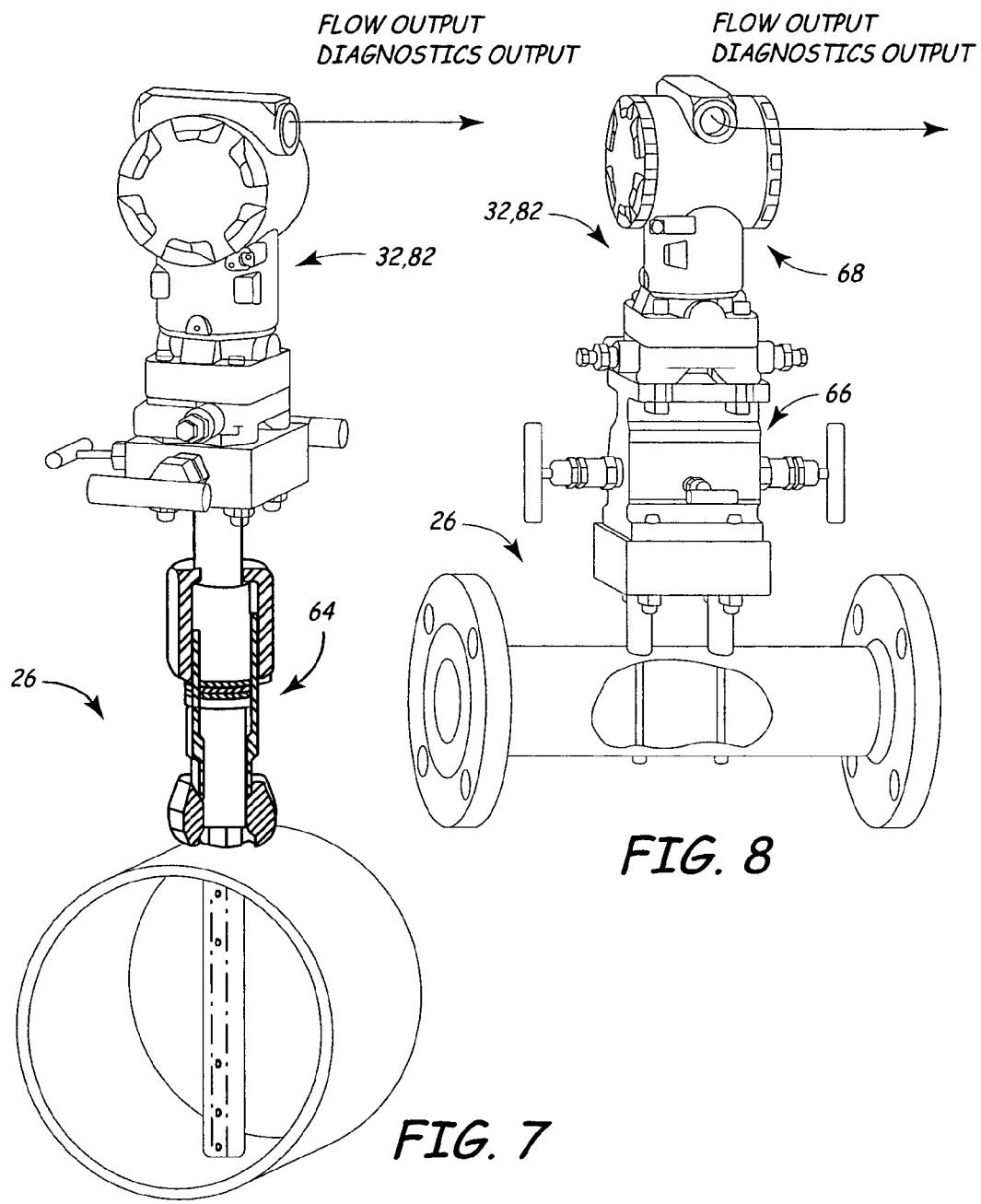
FIG. 7 illustrates a diagnostic fluid flow meter that has a pitot tube for a primary element.
FIG. 8 illustrates a diagnostic fluid flow meter that has an in-line pitot tube for a primary element.
Figure 10:
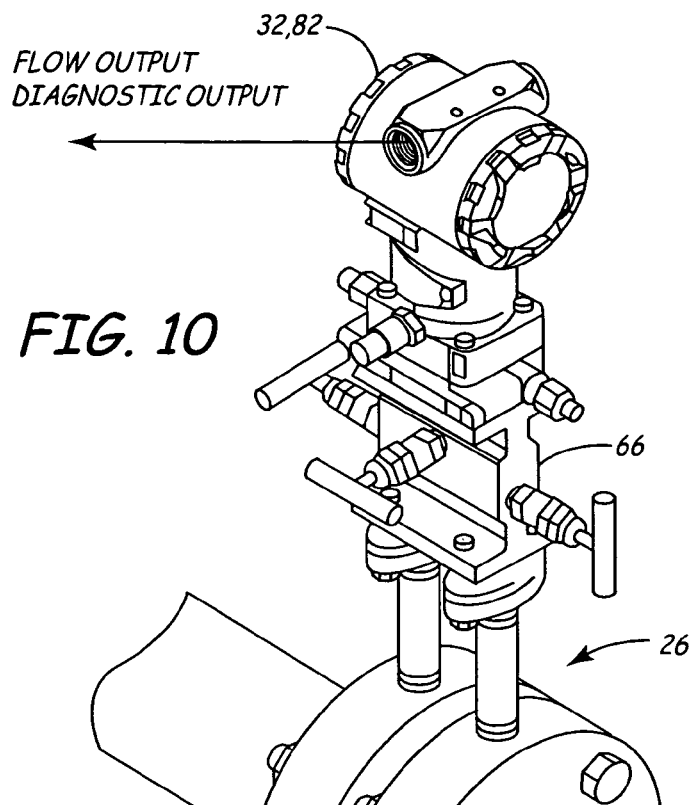
FIG. 10 illustrates a diagnostic fluid flow meter than has an orifice plate clamped between pipe flanges for a primary element.
Figure 9:
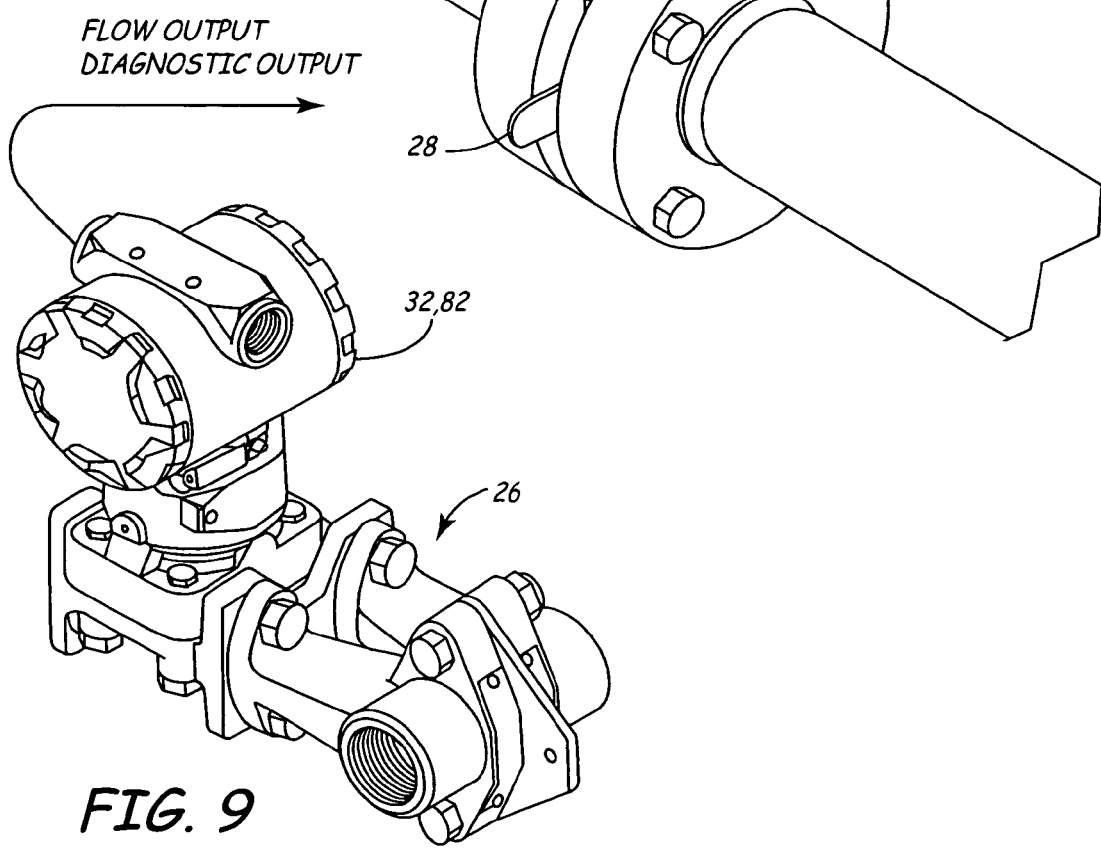
FIG. 9 illustrates a diagnostic fluid flow meter that has an integral orifice plate for a primary element.

In FIGS. 2-5, the transmitter generates a calibrated output and also a diagnostic output that indicates if the pressure generator is out of calibration. In FIGS. 2-5, the primary element can comprise a simple pitot tube or an averaging pitot tube. The averaging pitot tube 63 can be inserted through a tap 64 on a pipe as shown in FIG. 7. An instrument manifold 66, as shown in FIG. 8, can be coupled between the pressure generator 26 and a pressure transmitter 68. The primary element 28 and impulse pipes 30 can be combined in an integral orifice as shown in FIG. 9. An orifice plate adapted for clamping between pipe flanges is shown in FIG. 10. The primary element can comprise a venturi as shown in FIG. 11 or a nozzle as shown in FIG. 12, or an orifice as shown in FIG. 13. A standard arrangement of a pressure generator can be used with a transmitter that is adapted to provide the diagnostics outputs. The transmitter adapts itself to the characteristics of the pressure generator during the training mode and has a standard of comparison stored during the training mode that is available for comparison during the monitoring or operational mode. The standard of comparison can be adjusted as needed by a technician via the digital communication bus. In each arrangement, the fluid flow meter provides a calibrated flow rate output and the diagnostic output of the transmitter indicates if the pressure generator is out of calibration.

Figure 14:
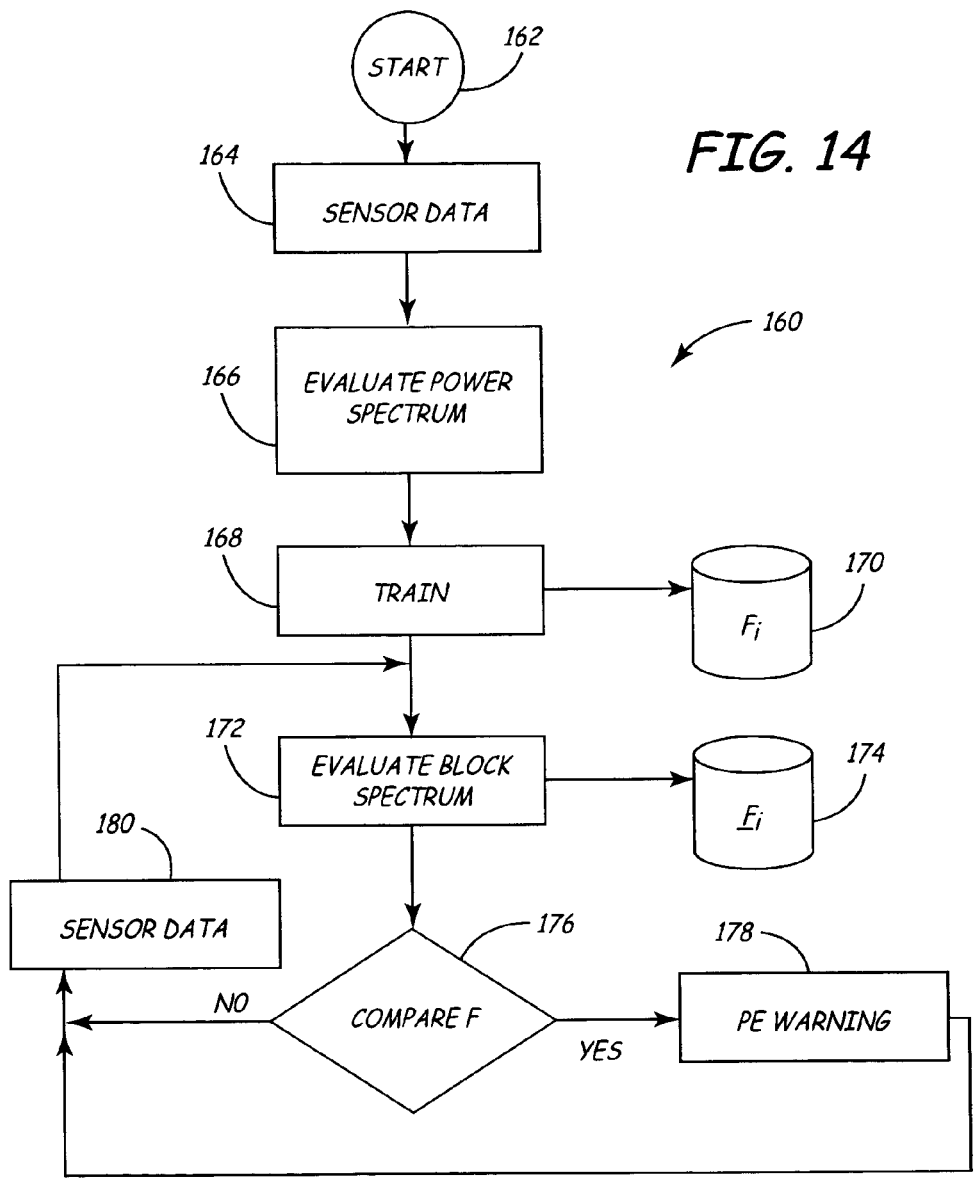
FIG. 14 is a flow chart of a process of diagnosing the condition of a primary element.

In FIG. 14, a flow chart 160 of a process for diagnosing the condition of a primary element is shown. The condition of the primary element can include erosion or fouling of the primary element. The method or algorithm starts at 162. Sensor data is taken in a training mode or time interval as shown at 164. A power spectrum of the sensor data, minus the moving average, is calculated at 166. The power spectrum obtained is identified as the training power spectrum at 168 and stored in non-volatile memory 170. After completion of training, the process moves on to monitoring or normal use. A further power spectrum of current sensor data, minus the moving average, is evaluated at 172, and the power spectrum so obtained in stored in memory 174, that can be either RAM or nonvolatile memory. At 176, the power spectrum Fi obtained during training is compared to the power spectrum F̲i obtained during monitoring. If there is a significant difference between Fi and F̲i which is indicative of a problem with the primary element, a primary element warning (PE Warning) is generated as shown at 178. If the power spectrums Fi and F̲i are sufficiently similar, then no primary element warning is generated. After the comparison at 176 and generation of a PE Warning, as needed, program flow moves to obtain new real time sensor data at 180 and the monitoring process moves on to a new evaluation at 172, or the flow meter can shut down when there is a PE warning. The process 160 can loop continuously in the monitoring mode to provide real time information concerning the condition of the primary element.

Figure 15:
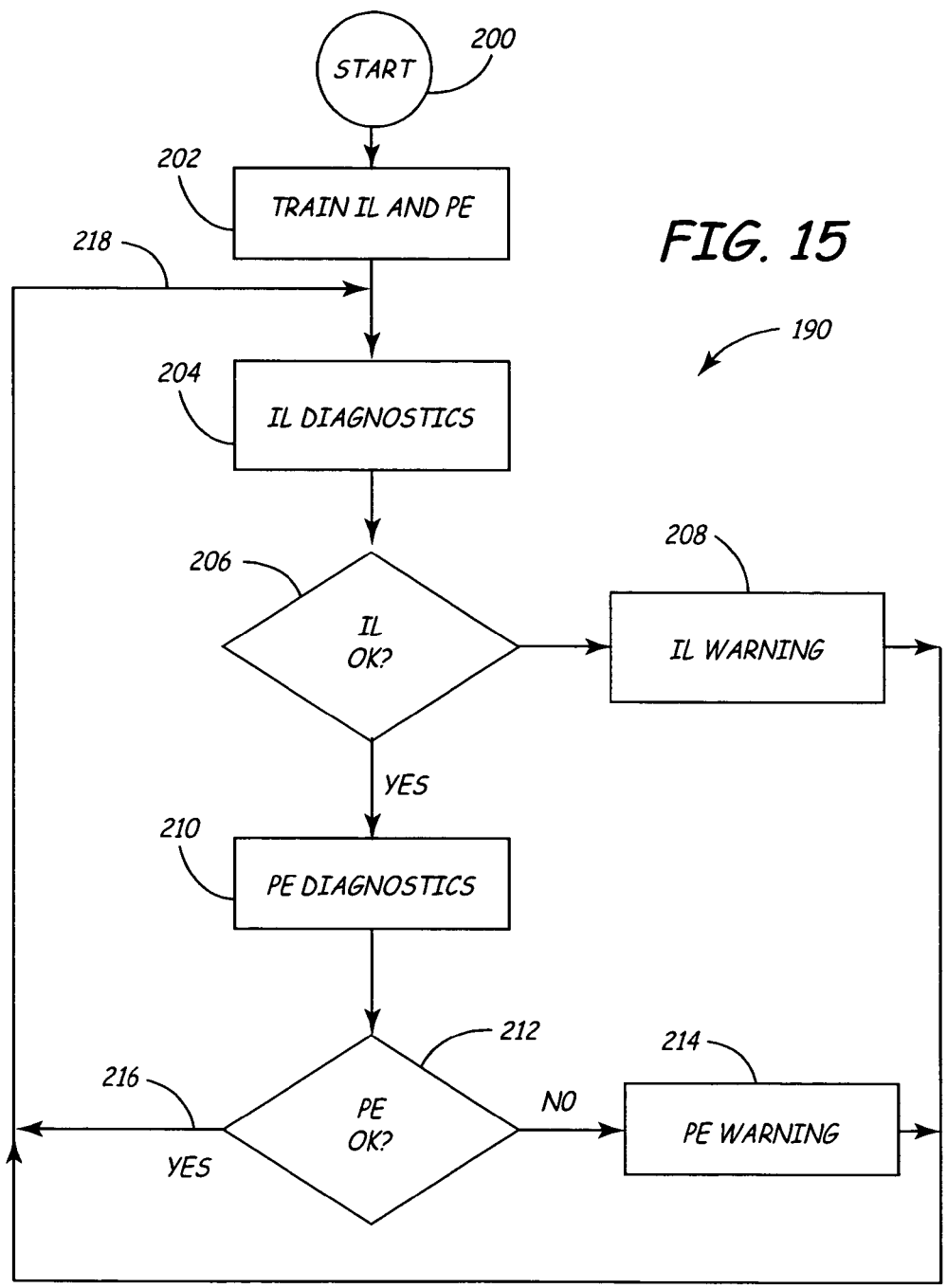
FIG. 15 is a flow chart of a process of diagnosing the condition of both impulse lines and a primary element.

In FIG. 15, a flow chart illustrates a process 190 which provides diagnosis of both primary element (PE) and impulse lines (IL). Program flow starts at 200. During a training mode illustrated at 202, sensor data, minus a moving average, is obtained and training power spectrum and training statistics are stored in nonvolatile memory as explained above. Next, impulse line diagnostics (such as those explained in process 128 in FIG. 6) are performed at step 204 in FIG. 15. In FIG. 15, after impulse line diagnostics are performed, current impulse line statistics are compared to historical (training) impulse line statistics (as detailed in processes 130, 132, 134, 136 in FIG. 6) at 206. If the comparison indicates a problem with plugging of impulse lines, then an impulse line warning is generated as shown at 208. If no problem with the impulse lines is apparent, then program flow moves on to primary element (PE) diagnostics at 210. At process 210, power spectral density for the current real time data is calculated (as explained above in connection with FIG. 14). The current power spectral density is compared to the historical power spectral density at 212, and if there is a difference large enough to indicate a problem with the primary element, then a PE Warning is generated as shown at 214. If the differences in the power spectral densities are small, then no PE warning is generated as shown at 216. Program flow continues on at 218 to repeat the IL and PE diagnostics, or the flow meter can be shut down if there is a PE or IL warning until maintenance is performed.

Any of the methods can be stored on a computer-readable medium as a plurality of sequences of instructions, the plurality of sequences of instructions including sequences that, when executed by a microprocessor system in a pressure transmitter cause the pressure transmitter to perform a diagnostic method relative to a primary element and impulse lines couplable to the transmitter.

Figure 16:
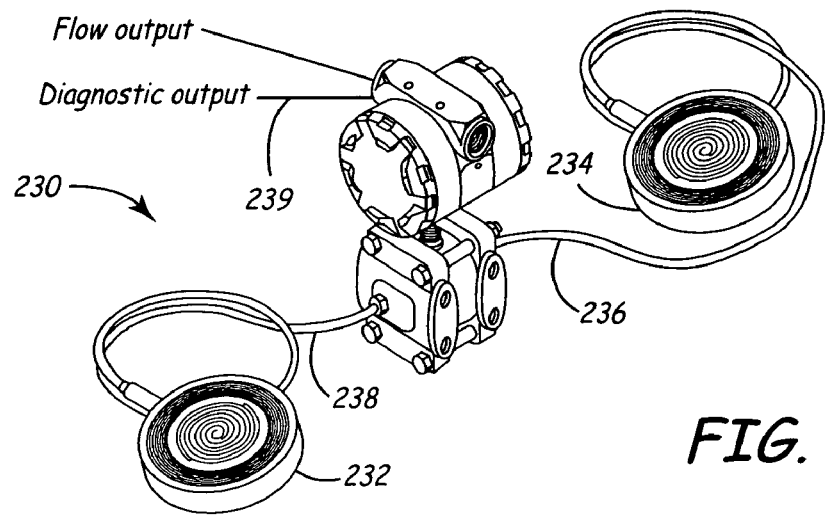
FIG. 16 is an illustration of a transmitter with remote seals and diagnostics.

FIG. 16 illustrates a transmitter 230 which includes remote seals 232, 234 connected by flexible capillary tubes 236, 238 that are filled with a controlled quantity of isolation fluid such as silicon oil. The isolator arrangement permits placement of the sensor and electronics of transmitter 230 to be spaced away from extremely hot process fluids which contact the remote seals. The diagnostic circuitry of transmitter 230 can also be used to detect leaking and pinching off of capillary tubes 236, 238 using the diagnostic techniques described above to provide diagnostic output 239.

Figure 17:
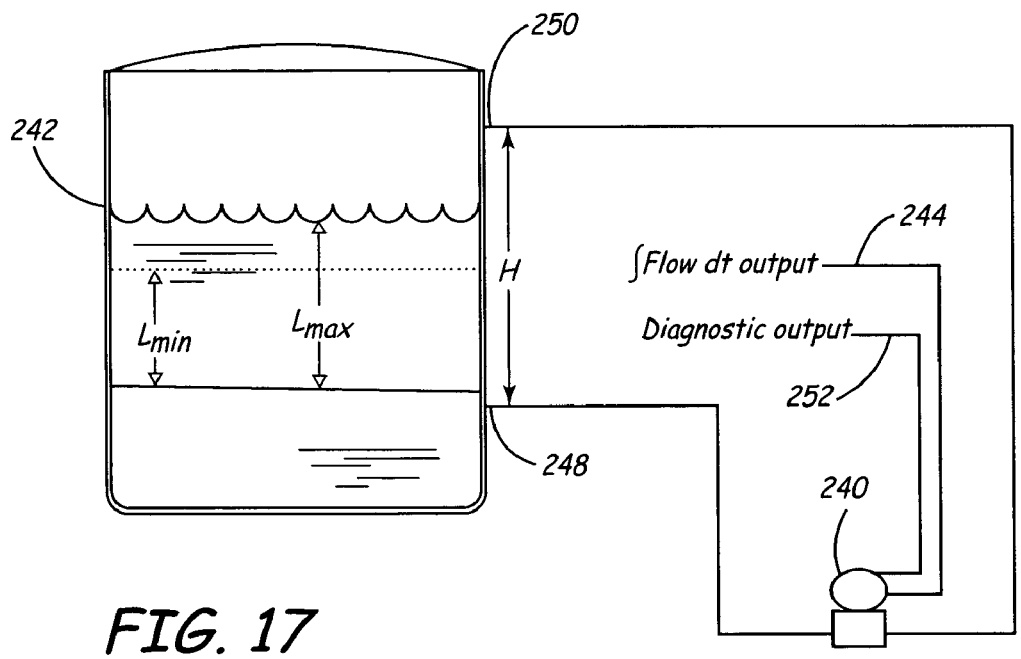
FIG. 17 is a schematic illustration of a transmitter with diagnostic features connected to a tank to measure a time integral of flow in and out of the tank.

FIG. 17 schematically illustrates a transmitter 240 which is connected to taps 248, 250 near the bottom and top of tank 242. Transmitter 240 provides an output 244 that represents a time integral of flow in and out of the tank 242. Transmitter 240 includes circuitry, or alternatively software, that measures the differential pressure between the taps 248, 250 and computes the integrated flow as a function of the sensed differential pressure and a formula stored in the transmitter relating the sensed pressure to the quantity of fluid in the tank. This formula is typically called a strapping function and the quantity of fluid which has flowed into or out of the tank can be integrated as either volumetric or mass flow, depending on the strapping function stored in transmitter 240. The diagnostic circuitry or software in transmitter 240 operates as explained above to provide diagnostic output 252. FIG. 17 is a schematic illustration, and transmitter 240 can be located either near the bottom or the top of tank 242, with a tube going to the other end of the tank, of ten called a "leg." This leg can be either a wet leg filled with the fluid in the tank, or a dry leg filled with gas. Remote seals can also be used with transmitter 240.

In one embodiment, microprocessor system 88 includes signal preprocessor which is coupled to sensor 88 through analog to digital converter 84 which isolates signal components in the sensor signal such as frequencies, amplitudes or signal characteristics which are related to a plugged impulse line 30 or degraded primary element 28. The signal preprocessor provides an isolated signal output to a signal evaluator in microprocessor 88. The signal preprocessor isolates a portion of the signal by filtering, performing a wavelet transform, performing a Fourier transform, use of a neural network, statistical analysis, or other signal evaluation techniques. Such preprocessing is preferably implemented in microprocessor 88 or in a specialized digital signal processor. The isolated signal output is related to a plugged or plugging impulse line 30 or degraded primary element 28 sensed by sensor 31.

Figure 18:
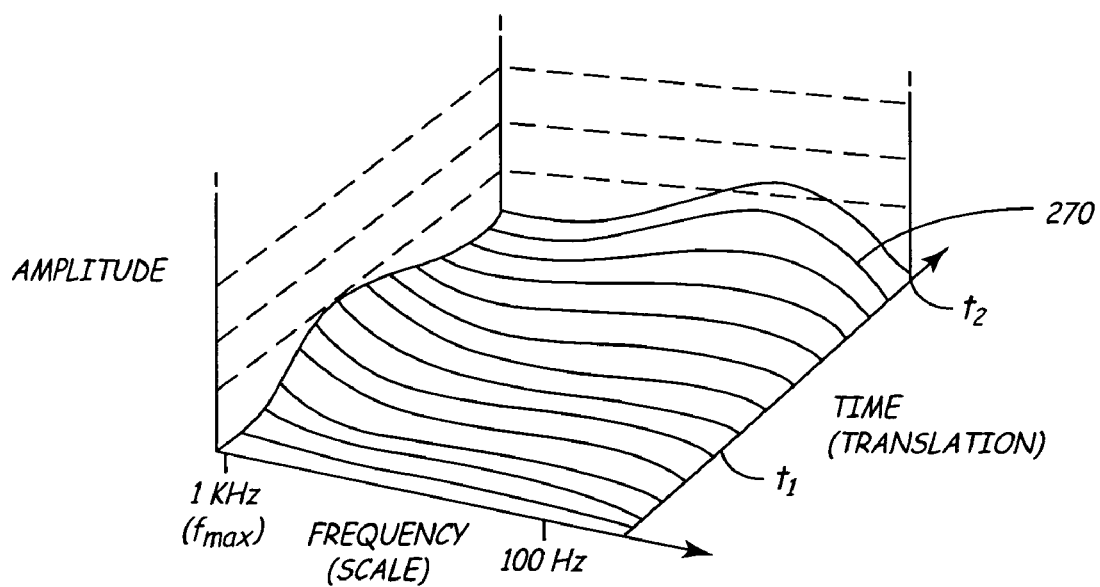
FIG. 18 is a graph of amplitude versus frequency versus time of a process variable signal.
Figure 19:
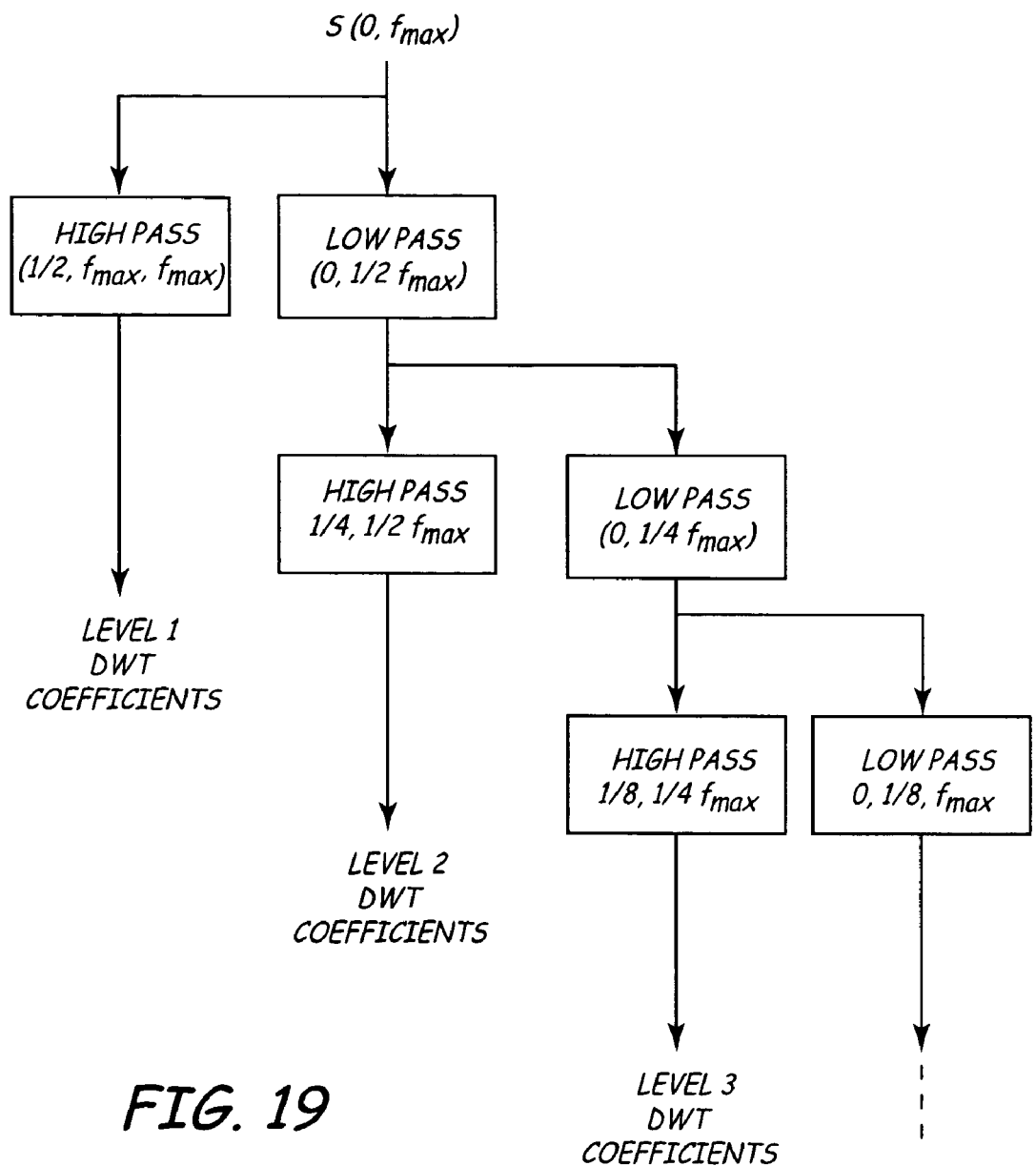
FIG. 19 is a block diagram of a discrete wavelet transformation.
Figure 20:
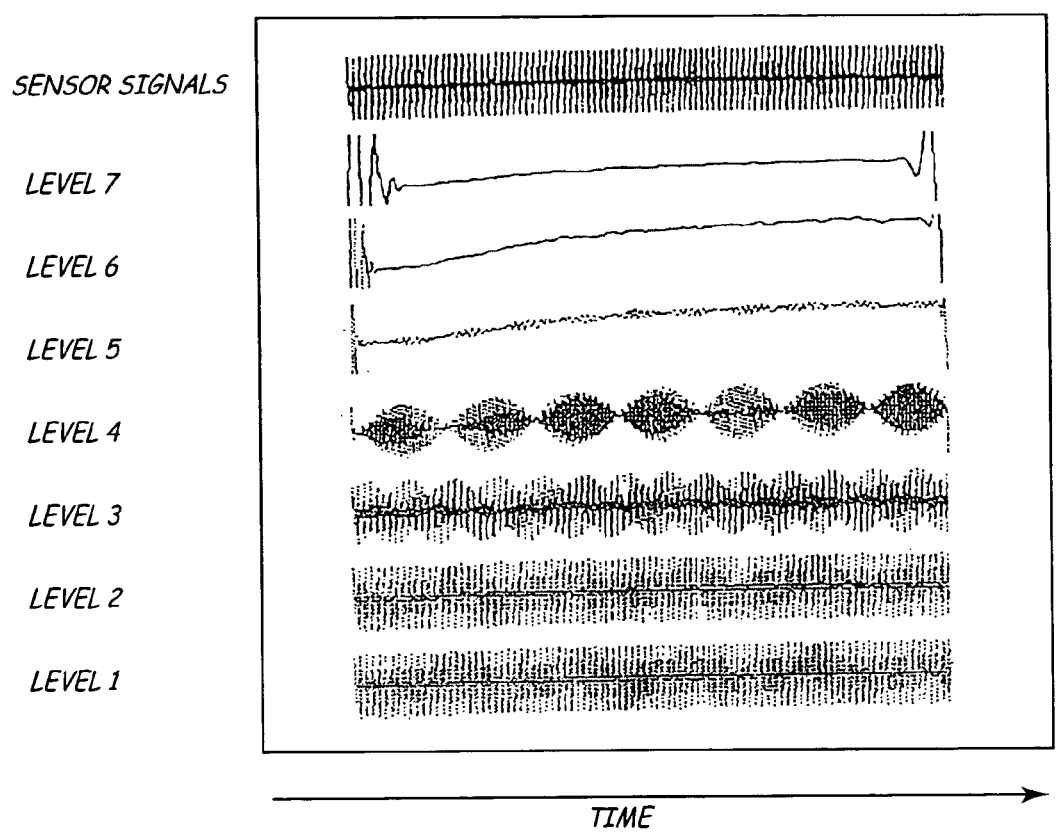
FIG. 20 is a graph showing signals output from a discrete wavelet transformation.

The signal components are isolated through signal processing techniques in which only desired frequencies or other signal characteristics such as amplitude are identified and an indication of their identification is provided. Depending upon the strength signals to be detected and their frequency, signal preprocessor can comprise a filter, for example a band pass filter, to generate the isolated signal output. For more sensitive isolation, advanced signal processing techniques are utilized such as a Fast Fourier transform (FFT) to obtain the spectrum of the sensor signal. In one preferred embodiment, the signal preprocessor comprises a wavelet processor which performs a wavelet analysis on the sensor signal as shown in FIGS. 18, 19 and 20 using a discrete wavelet transform. Wavelet analysis is well suited for analyzing signals which have transients or other non-stationary characteristics in the time domain. In contrast to Fourier transforms, wavelet analysis retains information in the time domain, i.e., when the event occurred.

Wavelet analysis is a technique for transforming a time domain signal into the frequency domain which, like a Fourier transformation, allows the frequency components to be identified. However, unlike a Fourier transformation, in a wavelet transformation the output includes information related to time. This may be expressed in the form of a three dimensional graph with time shown on one axis, frequency on a second axis and signal amplitude on a third axis. A discussion of wavelet analysis is given in *On-Line Tool Condition Monitoring System With Wavelet Fuzzy Neural Network*, by L. Xiaoli et al., 8 JOURNAL OF INTELLIGENT MANUFACTURING pgs. 271-276 (1997). In performing a continuous wavelet transformation, a portion of the sensor signal is windowed and convolved with a wavelet function. This convolution is performed by superimposing the wavelet function at the beginning of a sample, multiplying the wavelet function with the signal and then integrating the result over the sample period. The result of the integration is scaled and provides the first value for continuous wavelet transform at time equals zero. This point may be then mapped onto a three dimensional plane. The wavelet function is then shifted right (forward in time) and the multiplication and integration steps are repeated to obtain another set of data points which are mapped onto the 3-D space. This process is repeated and the wavelet is moved (convolved) through the entire signal. The wavelet function is then scaled, which changes the frequency resolution of the transformation, and the above steps are repeated.

Data from a wavelet transformation of a sensor signal from sensor 31 is shown in FIG. 18. The data is graphed in three dimensions and forms a surface 270. As shown in the graph of FIG. 18, the sensor signal includes a small signal peak at about 1 kHz at time $t_1$ and another peak at about 100 Hz at time $t_2$. Through subsequent processing by the signal evaluator, surface 270 or portions of surface 270 are evaluated to determine impulse piping or primary element degradation.

The continuous wavelet transformation described above requires extensive computations. Therefore, in one embodiment, microprocessor 88 performs a discrete wavelet transform (DWT) which is well suited for implementation in microprocessor system. One efficient discrete wavelet transform uses the Mallat algorithm which is a two channel sub-band coder. The Mallet algorithm provides a series of separated or decomposed signals which are representative of individual frequency components of the original signal. FIG. 19 shows an example of such a system in which an original sensor signal S is decomposed using a sub-band coder of a Mallet algorithm. The signal S has a frequency range from 0 to a maximum of $f_{MAX}$. The signal is passed simultaneously through a first high pass filter having a frequency range from ½ $f_{MAX}$ to $f_{MAX}$, and a low pass filter having a frequency range from 0 to ½ $f_{MAX}$. This process is called decomposition. The output from the high pass filter provides "level 1" discrete wavelet transform coefficients. The level 1 coefficients represent the amplitude as a function of time of that portion of the input signal which is between ½ $f_{max}$ and $f_{MAX}$. The output from the 0-½ $f_{max}$ low pass filter is passed through subsequent high pass (¼ $f_{max}$-½ $f_{max}$) and low pass (0-¼ $f_{max}$) filters, as desired, to provide additional levels (beyond "level 1") of discrete wavelet transform coefficients. The outputs from each low pass filter can be subjected to further decompositions offering additional levels of discrete wavelet transformation coefficients as desired. This process continues until the desired resolution is achieved or the number of remaining data samples after a decomposition yields no additional information. The resolution of the wavelet transform is chosen to be approximately the same as the sensor or the same as the minimum signal resolution required to monitor the signal. Each level of DWT coefficients is representative of signal amplitude as a function of time for a given frequency range. Coefficients for each frequency range are concatenated to form a graph such as that shown in FIG. 18.

In some embodiments, padding is added to the signal by adding data to the sensor signal near the borders of windows used in the wavelet analysis. This padding reduces distortions in the frequency domain output. This technique can be used with a continuous wavelet transform or a discrete wavelet transform. "Padding" is defined as appending extra data on either side of the current active data window, for example, extra data points are added which extend 25% of the current window beyond either window edge. In one embodiment, the padding is generated by repeating a portion of the data in the current window so that the added data "pads" the existing signal on either side. The entire data set is then fit to a quadratic equation which is used to extrapolate the signal 0.25% beyond the active data window.

FIG. 20 is an example showing a signal S generated by sensor 31 and the resultant approximation signals yielded in seven decomposition levels labeled level 1 through level 7. In this example, signal level 7 is representative of the lowest frequency DWT coefficient which can be generated. Any further decomposition yields noise. All levels, or only those levels which relate impulse piping or primary element degradation are provided.

Microprocessor 88 evaluates the isolated signal received from the signal preprocessing and in one embodiment, monitors an amplitude of a certain frequency or range of frequencies identified and provides a diagnostic output if a threshold is exceeded. Signal evaluator can also comprise more advanced decision making algorithms such as fuzzy logic, neural networks, expert systems, rule based systems, etc. Commonly assigned U.S. Pat. No. 6,017,143 describes various decision making systems which can be implemented in signal evaluator 154 and is incorporated herein by reference.

Microprocessor 88 performs diagnostics related to the impulse piping or primary element using information derived from the differential pressure sensor 31. The following describes a number of embodiments for realizing a diagnostic circuit. The diagnostic circuit can provide a residual lifetime estimate, an indication of a failure, an indication of an intending failure or a calibration output which is used to correct for errors in the sensed process variable.

A. Polynomial Curvefit

In one embodiment of the present invention empirical models or polynomial curve-fitting are used to detect line plugging or primary element degradation. A polynomial-like equation which has a combination of input signals such as various statistical parameters can be used to detect primary element degradation or impulse line plugging. Constants for the equations can be stored in a memory in the transmitter or received over the communication loop 242.

B. Neural Networks

Figure 21:
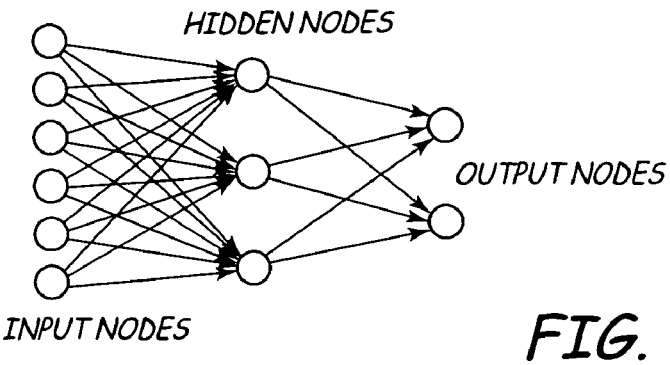
FIG. 21 is a diagram showing a simplified neural network.

The signal can be analyzed using a neural network. One such neural network is a multi-layer neural network. Although a number of training algorithms can be used to develop a neural network model for different goals. One embodiment includes the known Backpropagation Network (BPN) to develop neural network modules which will capture the nonlinear relationship among a set of input and output(s). FIG. 21 shows a typical topology of a three-layer neural network architecture implemented in microprocessor 88. The first layer, usually referred to as the input buffer, receives the information, and feeds them into the inner layers. The second layer, in a three-layer network, commonly known as a hidden layer, receives the information from the input layer, modified by the weights on the connections and propagates this information forward. This is illustrated in the hidden layer which is used to characterize the nonlinear properties of the system analyzed. The last layer is the output layer where the calculated outputs (estimations) are presented to the environment.

Figure 22A:
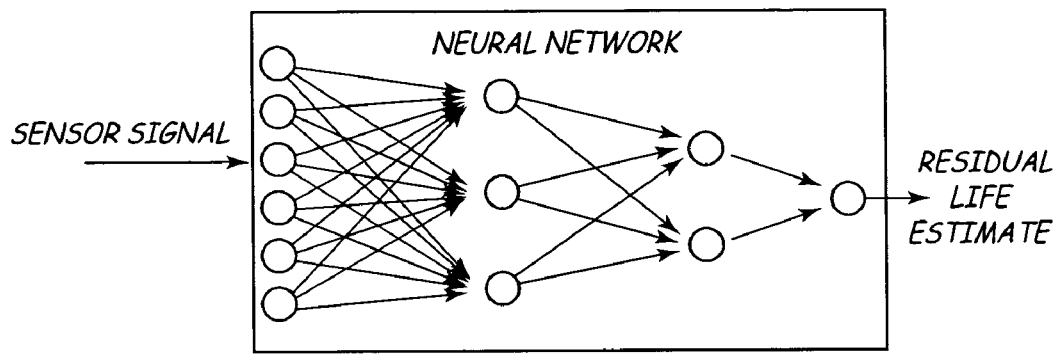
FIG. 22A is a diagram showing a neural network used to provide a residual lifetime estimate.
Figure 22B:
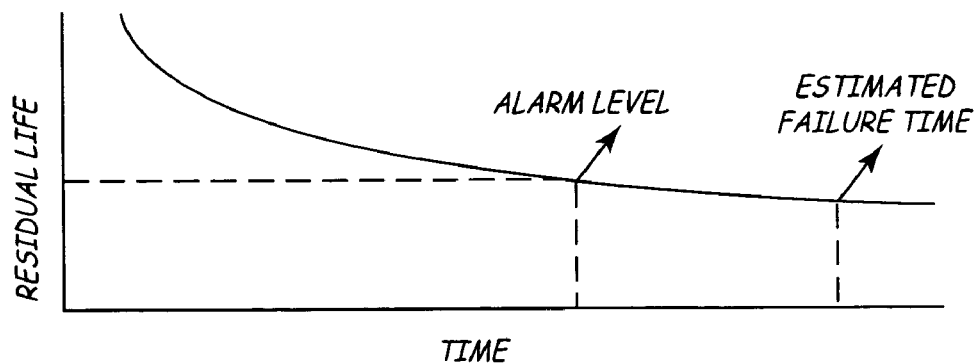
FIG. 22B is a graph of residual life versus time.

FIG. 22A shows a schematic of a neural network which provides a residual life estimate for a primary element or impulse pipe based upon a sensor signal. The sensor signal can be either a raw sensor signal or a sensor signal which has been processed through signal processing techniques. FIG. 22B is a graph of residual life versus time and shows that an alarm level can be set prior to an estimated failure time. This allows the system to provide an alarm output prior to actual failure of the device.

C. Threshold Circuitry

This embodiment uses a set of if-then rules to reach a conclusion on the status of the impulse piping or primary element. This embodiment may be implemented easily in analog or digital circuitry. For example, with a simple rule, if the signal drops a certain amount below a historical mean, an output can be provided which indicates that an impulse line is plugged or is in the process of becoming plugged. Of course, more complex rules can be used which use multiple statistical parameters or signal components of the sensor signal to provide more accurate or different information.

D. Wavelets

With this embodiment, one or more of the decomposition signal(s) in a wavelet analysis directly relate to line plugging and are used to diagnose the transmitter.

Figure 23A:
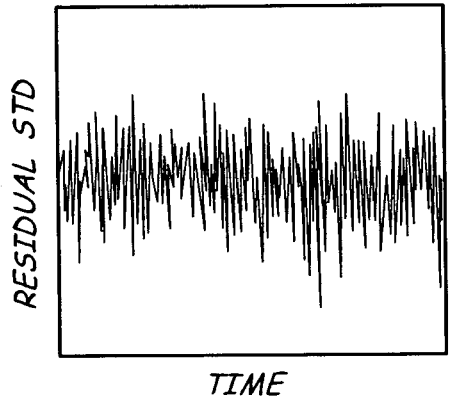
FIG. 23A and FIG. 23B are graphs of the residual standard deviation versus time.
Figure 23B:
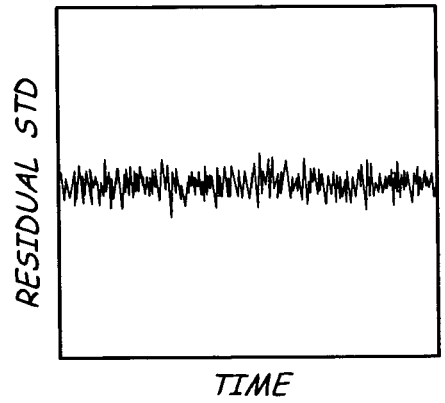
Figure 24A:
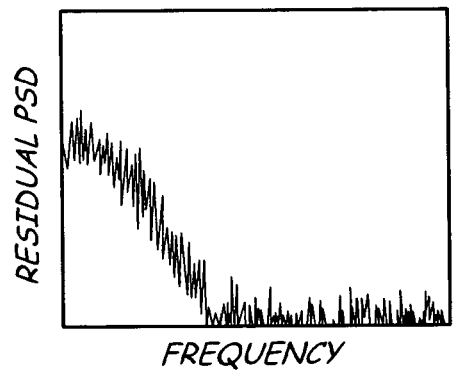
FIG. 24A and FIG. 24B are graphs of the residual power spectral density versus frequency.
Figure 24B:
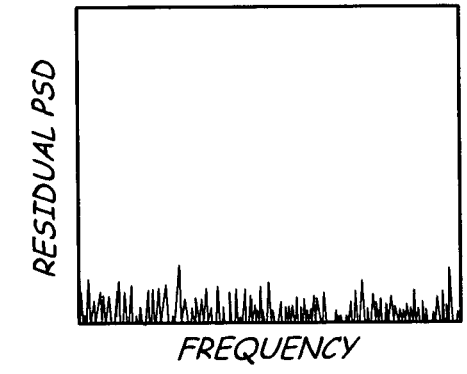

Turning now to some specific example of impulse line clogging, FIG. 23A and FIG. 23B are graphs of residual standard deviation (STD) versus time. FIG. 23A corresponds to the signal from a pressure sensor in which the impulse piping is not clogged or otherwise degraded. However, in FIG. 23B, the effects of clogging on the residual standard deviation are illustrated. Similarly, FIG. 24A and FIG. 24B are graphs of residual power spectral density versus frequency. FIG. 24A corresponds to a pressure sensor output during normal operation. In contrast, FIG. 24B illustrates the residual power spectral density when the impulse pipe is clogged or in the process of clogging. The differences between graphs 23A and 23B and graphs 24A and 24B can be used to detect a clogged or clogging impulse pipe.

Although the present invention has been described with reference to preferred embodiments, workers skilled in the art will recognize that changes can be made in form and detail without departing from the spirit and scope of the invention. For example, various function blocks of the invention have been described in terms of circuitry, however, many function blocks may be implemented in other forms such as digital and analog circuits, software and their hybrids. When implemented in software, a microprocessor performs the functions and the signals comprise digital values on which the software operates. A general purpose processor programmed with instructions that cause the processor to perform the desired process elements, application specific hardware components that contain circuit wired to perform the desired elements and any combination of programming a general purpose processor and hardware components can be used. Deterministic or fuzzy logic techniques can be used as needed to make decisions in the circuitry or software. Because of the nature of complex digital circuitry, circuit elements may not be partitioned into separate blocks as shown, but components used for various functional blocks can be intermingled and shared. Likewise with software, some instructions can be shared as part of several functions and be intermingled with unrelated instructions within the scope of the invention. The present invention can be used with absolute, differential, gage, or other types of pressure sensors and the transmitter can measure any type of process variable including those other than flow. The diagnostic output can be a predictive indicator of a future failure, such as the future partial or complete plugging of an impulse line. The diagnostics can be applied to impulse piping and/or primary elements.

What is claimed is:

1. A pressure transmitter adapted to couple to a process fluid to sense pressure, the pressure transmitter comprising:
a pressure sensor adapted to measure pressure of the process fluid and provide a sensor signal;
a first algorithm calculating a difference between the sensor signal and a moving average of the sensor signal;
a second algorithm receiving the difference and calculating a trained data set of historical data during a training mode and calculating a current data set during a monitoring mode and generating diagnostic data as a function of the current data set relative to the historical data, the diagnostic data indicative of a condition of a primary element; and an output configured to provide an output related to pressure of the process fluid.

2. The pressure transmitter of claim 1 including a stored trained data set.

3. The pressure transmitter of claim 1 wherein the moving average is calculated according to the series $$A_j = \sum_{k=0}^{m} (P_{j+k})(W_k)$$

where A is the moving average, P is a series of sensed pressure values, and W is a weight for a sensed pressure value, m is a number of previous sensed pressure values in the series.

4. The pressure transmitter of claim 1 wherein the trained data set comprises statistical data.

5. The pressure transmitter of claim 1 including a stored trained data set.

6. The pressure transmitter of claim 1 wherein the diagnostic data indicates a condition of a pressure generator.

7. The pressure transmitter of claim 1 wherein the diagnostic data indicates a condition of a primary flow element.

8. The pressure transmitter of claim 1 wherein the output comprises a calibrated output which is adjusted based upon the diagnostic data.

9. The pressure transmitter of claim 1 wherein the trained data set of historical data is related to power spectral density of the difference.

10. The pressure transmitter of claim 9 wherein the power spectral density data is in the range of 0 to 100 Hertz.

11. The pressure transmitter of claim 1 wherein the diagnostic data is generated from an algorithm selected from the group of algorithms consisting of neural networks, fuzzy logic, wavelets and Fourier transforms.

12. The pressure transmitter of claim 1 wherein the pressure sensor comprises a differential pressure sensor.

13. The pressure transmitter of claim 1 wherein the pressure sensor comprises an absolute pressure sensor.

14. The pressure transmitter of claim 1 wherein the pressure sensor comprises a gauge pressure sensor.

15. The pressure transmitter of claim 1 wherein the diagnostic data provides a predictive indication of a future occurrence of a diagnostic condition.

16. The pressure transmitter of claim 1 wherein the current data set and historical data comprise time domain data.

17. The pressure transmitter of claim 1 wherein the current data set and historical data comprise frequency domain data.

18. A pressure transmitter adapted to couple to a process via an impulse line to sense a pressure of process fluid, the pressure transmitter comprising:

pressure sensor adapted to couple to the impulse line;

a measurement circuit coupled to the sensor and generating an output related to sensed pressure;

a difference circuit coupled to the sensor and configured to generate a difference output representing the sensed pressure minus a moving average;

a calculate circuit receiving the difference output, configured to calculate a trained output of historical data obtained during training, and to calculate a monitor output of current data obtained during monitoring; and a diagnostic circuit configured to receive the trained output and the monitor output and generate a diagnostic output indicating a current condition of a primary element.

19. The pressure transmitter of claim 18 wherein the pressure sensor includes a remote seal.

20. The pressure transmitter of claim 19 wherein the sensed pressure output is a indicative of a quantity of fluid in a tank.

21. The pressure transmitter of claim 20 further including a wet leg.

22. The pressure transmitter of claim 20 further including a dry leg.

23. The pressure transmitter of claim 18 wherein the calculate circuit stores the historical data.

24. The pressure transmitter of claim 18 wherein the moving average is calculated according to the series $$A_j = \sum_{k=0}^{m} (P_{j+k})(W_k)$$

where A is the moving average, P is a series of sensed pressure values, and W is a weight for a sensed pressure value, m is a number of previous sensed pressure values in the series.

25. The pressure transmitter of claim 18 wherein the historical data comprises statistical data.

26. The pressure transmitter of claim 18 wherein the output relate to sensed pressure comprises a calibrated output and which is adjusted based upon the diagnostic output.

27. The pressure transmitter of claim 18 wherein the historical data comprises power spectral density of the difference output.

28. The pressure transmitter of claim 27 wherein the power spectral density data is in the range of 0 to 100 Hertz.

29. The pressure transmitter of claim 18 wherein the diagnostic circuit implements a diagnostic algorithm selected from the group of algorithms consisting of neural networks, fuzzy logic, wavelets and Fourier transforms.

30. The pressure transmitter of claim 18 wherein the pressure sensor comprises a differential pressure sensor.

31. The pressure transmitter of claim 18 wherein the pressure sensor comprises an absolute pressure sensor.

32. A transmitter adapted to measure process flow, comprising:

a pressure sensor adapted to sense pressure of a process fluid;

a difference circuit coupled to the sensor and configured to generate a difference output representing the sensed pressure minus a moving average;

a calculate circuit configured to receive the difference output and calculate a trained output of historical data obtained during training and to calculate a monitor output of current data obtained during monitoring; and a diagnostic circuit configured to receive the trained output and the monitor output and to generate a diagnostic output indicative of a condition of a primary element of the transmitter.

33. The transmitter of claim 32 wherein the historical data comprises power spectral density of the difference output.

34. The pressure transmitter of claim 32 wherein the pressure sensor comprises a differential pressure sensor.

35. The pressure transmitter of claim 32 wherein the pressure sensor comprises an absolute pressure sensor.

36. The pressure transmitter of claim 32 wherein the diagnostic output provides a predictive indication of a future occurrence of a diagnostic condition.

37. The pressure transmitter of claim 32 wherein the current data and historical data comprise time domain data.

38. The pressure transmitter of claim 32 wherein the current data and historical data comprise frequency domain data.

39. The transmitter of claim 32 wherein the diagnostic circuit implements a diagnostic algorithm selected from the group of algorithms consisting of neural networks, fuzzy logic, wavelets and Fourier transforms.

40. A diagnostic method for diagnosing a pressure transmitter coupled to a process fluid, the method comprising:
    calculating a difference between a pressure sensed by the pressure transmitter and a moving average of the sensed pressure;
    acquiring and storing an historical data set of the calculated difference during a train mode of the pressure transmitter;
    acquiring and storing a current data set of the calculated difference during a monitoring mode of the pressure transmitter; and
    comparing the current data set to the historical data set to diagnose the condition of a primary element of the pressure transmitter.

41. The method of diagnosis of claim 40 wherein the historical data set comprises statistical data on the calculated difference.

42. The method of diagnosis of claim 41 wherein the current data set comprises current data on the sample average (X) and sample deviation (s) of the calculated difference.

43. The method of diagnosis of claim 42 wherein the sample average (X) is compared to the mean (μ) to diagnose erosion of the primary element.

44. The method of diagnosis of claim 40 wherein the historical data set comprises data on the power spectral density of the calculated difference.

45. The method of diagnosis of claim 44 wherein the current data set comprises data on power spectral density of the calculated difference.

46. The method of diagnosis of claim 40 wherein the comparing includes performing a diagnostic algorithm selected from the group of algorithms consisting of neural networks, fuzzy logic, wavelets and Fourier transforms.

47. A transmitter configured to perform the method of claim 40.

48. Control room equipment configured to perform the method of claim 40.

49. The method of claim 40 wherein the pressure comprises a differential pressure.

50. The method of claim 40 wherein the pressure comprises an absolute pressure sensor.

51. The method of claim 40 wherein the current data set and historical data comprise time domain data.

52. The method of claim 40 wherein the current data set and historical data comprise frequency domain data.

53. A computer-readable medium having stored thereon instructions executable by a microprocessor system to cause the microprocessor system to perform a diagnostic operation on a pressure transmitter coupled to a process fluid, the instructions comprising:
    calculating a difference between a pressure sensed by the pressure transmitter and a moving average of the sensed pressure;
    acquiring and storing an historical data set of the calculated difference during a train mode of the pressure transmitter;
    acquiring and storing a current data set of the calculated difference during a monitoring mode of the pressure transmitter; and
    comparing the current data set to the historical data set to diagnose the condition of a primary element of the pressure transmitter.

54. A pressure transmitter adapted to couple to a process fluid to sense process pressure, the pressure transmitter comprising:
    a pressure sensor for sensing process pressure;
    differencing means for generating a difference output representing the sensed pressure minus a moving average;
    calculating means for receiving the difference output for calculating a trained output of historical data obtained during training and for calculating a monitor output of current data obtained during monitoring; and
    diagnosing means for receiving the trained output and the monitor output, generating a diagnostic output and diagnosing a current condition of a primary of the pressure transmitter.

55. A pressure transmitter for coupling to a process control loop and providing an output related to a pressure of process fluid, comprising:
    a pressure sensor adapted to measure a pressure of the process fluid and responsively provide a sensor output;
    impulse piping configured to couple the pressure sensor to the process fluid;
    computation circuitry adapted to calculate a statistical parameter of the pressure sensor output;
    memory adapted to contain a baseline statistical parameter of the pressure sensor output;
    diagnostic circuitry configured to compare the stored baseline statistical parameter of the pressure sensor output to a current statistical parameter and responsively provide a diagnostic output based upon the comparison, the diagnostic output indicative of a condition of a primary element of the pressure transmitter; and
    output circuitry to provide an output related to the sensed pressure.

56. The transmitter of claim 55 wherein the statistical parameter comprises standard deviation.

57. The transmitter of claim 55 wherein the diagnostic circuitry comprises fuzzy logic which employs a membership function.

58. The transmitter of claim 56 including a fuzzy membership function stored in the memory and wherein diagnostic circuitry applies the membership function to the statistical parameter.

59. The transmitter of claim 55 wherein the pressure sensor comprises a differential pressure sensor.

60. The transmitter of claim 55 wherein the statistical parameter comprises power spectral density.

61. The transmitter of claim 55 wherein the baseline impulse piping is related to substantially new impulse piping.

62. The transmitter of claim 55 wherein the diagnostic circuit implements a diagnostic algorithm selected from the group of algorithms consisting of neural networks, fuzzy logic, wavelets and Fourier transforms.

63. The pressure transmitter of claim 55 wherein the pressure sensor comprises a differential pressure sensor.

64. The pressure transmitter of claim 55 wherein the pressure sensor comprises an absolute pressure sensor.

65. The pressure transmitter of claim 55 wherein the pressure sensor comprises a gauge pressure sensor.

66. The pressure transmitter of claim 55 wherein the diagnostic output provides a predictive indication of a future occurrence of plugging of the impulse line.

67. The pressure transmitter of claim 55 wherein the baseline and historic statistical parameter comprise time domain data.

68. The pressure transmitter of claim 55 wherein the baseline and historic statistical parameter comprise frequency domain data.

69. A method for detecting a degrading of a primary element impulse piping used to couple a pressure transmitter to a process fluid in a process control system, comprising:
   obtaining a pressure measurement signal related to pressure of a process fluid;
   retrieving a baseline statistical parameter from a memory;
   calculating a current statistical parameter of the pressure measurement signal;
   comparing the baseline statistical parameter to the current statistical parameter; and
   providing a diagnostic output based upon the step of comparing, the diagnostic output indicative of a condition of a primary element of the pressure transmitter.

70. The method of claim 69 wherein comparing includes performing a fuzzy logic operation.

71. The method of claim 69 wherein calculating includes calculating standard deviation.

72. The method of claim 69 wherein the pressure sensor comprises a differential pressure sensor.

73. The method of claim 69 wherein the baseline is related to new impulse piping.

74. The method of claim 69 wherein the comparing implements an algorithm selected from the group of algorithms consisting of neural networks, fuzzy logic, wavelets and Fourier transforms.

75. The method of claim 69 wherein the pressure measurement comprises a differential pressure sensor.

76. The method of claim 69 wherein the pressure measurement comprises an absolute pressure sensor.

77. The method of claim 69 wherein the diagnostic output provides a predictive indication of a future occurrence of plugging of the impulse line.

78. The method of claim 69 wherein the baseline and current statistical parameter comprise time domain data.

79. The method of claim 69 wherein the baseline and current statistical parameter comprise frequency domain data.

* * * * *